(12) United States Patent
Kim et al.

(10) Patent No.: US 9,712,219 B2
(45) Date of Patent: Jul. 18, 2017

(54) METHOD FOR TRANSMITTING SIGNAL IN MULTI-ANTENNA WIRELESS COMMUNICATION SYSTEM AND APPARATUS FOR THE SAME

(71) Applicant: LG ELECTRONICS INC., Seoul (KR)

(72) Inventors: Youngtae Kim, Seoul (KR); Kijun Kim, Seoul (KR); Byounghoon Kim, Seoul (KR); Jonghyun Park, Seoul (KR); Bonghoe Kim, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 37 days.

(21) Appl. No.: 14/762,171

(22) PCT Filed: Feb. 19, 2014

(86) PCT No.: PCT/KR2014/001341
§ 371 (c)(1),
(2) Date: Jul. 20, 2015

(87) PCT Pub. No.: WO2014/129799
PCT Pub. Date: Aug. 28, 2014

(65) Prior Publication Data
US 2015/0358059 A1 Dec. 10, 2015

Related U.S. Application Data

(60) Provisional application No. 61/766,676, filed on Feb. 19, 2013.

(51) Int. Cl.
*H04B 7/04* (2017.01)
*H04B 7/0456* (2017.01)
*H04B 7/06* (2006.01)

(52) U.S. Cl.
CPC ......... *H04B 7/0469* (2013.01); *H04B 7/0456* (2013.01); *H04B 7/0617* (2013.01); *H04B 7/0671* (2013.01); *H04B 7/0473* (2013.01)

(58) Field of Classification Search
CPC .. H04B 7/0456; H04B 7/0469; H04B 7/0408; H04B 7/0413; H04B 7/0473; H04L 1/0009; H04W 16/28
See application file for complete search history.

(56) References Cited

U.S. PATENT DOCUMENTS

2011/0051834 A1* 3/2011 Lee ............... H04W 52/346
375/267
2011/0134849 A1 6/2011 Lee et al.
(Continued)

FOREIGN PATENT DOCUMENTS

KR  10-2009-0098643  9/2009
KR  10-2009-0131678  12/2009
(Continued)

OTHER PUBLICATIONS

PCT International Application No. PCT/KR2014/001341, Written Opinion of the International Searching Authority dated May 26, 2014, 11 pages.
(Continued)

*Primary Examiner* — Raj Jain
(74) *Attorney, Agent, or Firm* — Lee Hong Degerman Kang & Waimey

(57) ABSTRACT

The present invention relates to a method for a base station transmitting a precoded signal to user equipment in a wireless communication system supporting a multi-antenna. More specifically, precoding is conducted by using a precoding matrix to which large delay-cyclic delay diversity (LD-CDD) is applied, wherein the precoding matrix is
(Continued)

determined by dividing into matrices for a horizontal direction antenna and a perpendicular direction antenna.

12 Claims, 6 Drawing Sheets

(56) References Cited

U.S. PATENT DOCUMENTS

| | | | |
|---|---|---|---|
| 2011/0261894 A1 | 10/2011 | Yu et al. | |
| 2012/0120884 A1 | 5/2012 | Yu et al. | |
| 2012/0213111 A1* | 8/2012 | Shimezawa | H04B 7/063 370/252 |
| 2014/0219375 A1 | 8/2014 | Zhu et al. | |
| 2015/0105025 A1* | 4/2015 | Zhang | H01Q 3/26 455/63.4 |
| 2015/0288497 A1* | 10/2015 | Li | H04B 7/0413 370/329 |
| 2016/0191273 A1* | 6/2016 | Nagata | H04W 16/28 370/252 |

FOREIGN PATENT DOCUMENTS

| | | |
|---|---|---|
| KR | 10-2010-0039858 | 4/2010 |
| WO | 2009025493 | 2/2009 |
| WO | 2013000260 | 1/2013 |
| WO | 2014052806 | 4/2014 |

OTHER PUBLICATIONS

PCT International Application No. PCT/KR2014/001341, Written Opinion of the International Searching Authority dated May 26, 2014, 13 pages.

Bell, "Considerations on CSI feedback enhancements for high-priority antenna configurations," 3GPP TSG-RAN WG1 #66, R1-112420, Aug. 2011, 8 pages.

European Patent Office Application Serial No. 14754592.5, Search Report dated Sep. 9, 2016, 11 pages.

* cited by examiner

FIG. 3
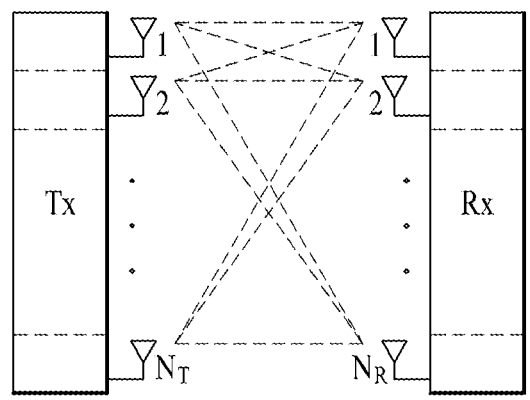
(a)
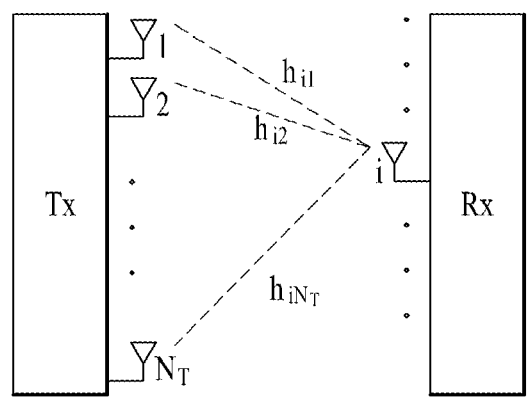
(b)

FIG. 4
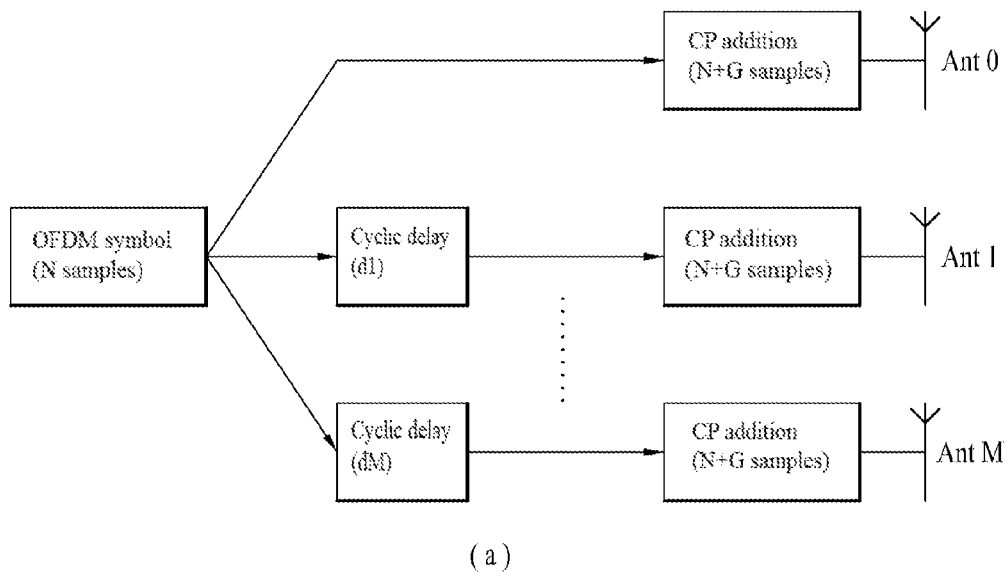
(a)
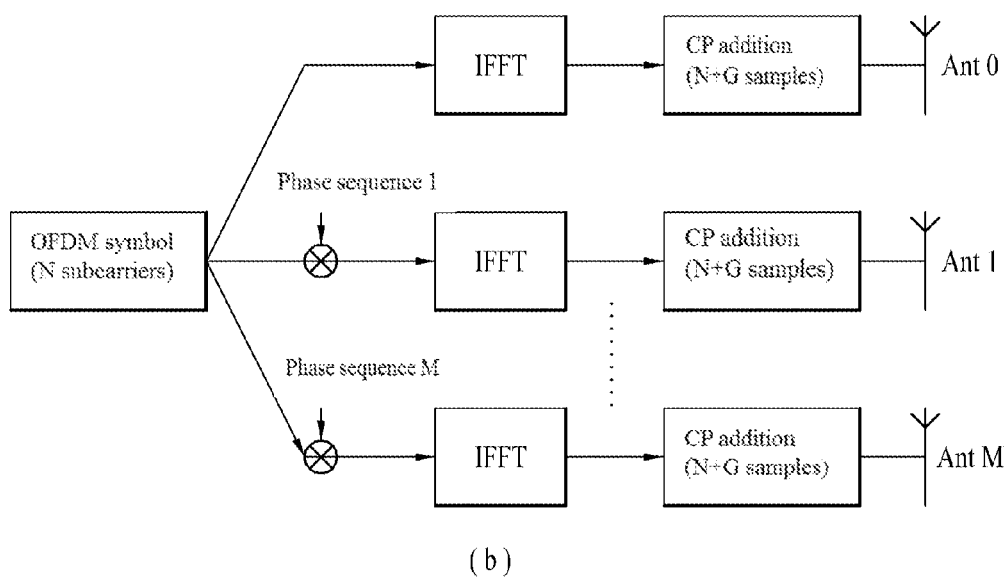
(b)

FIG. 5
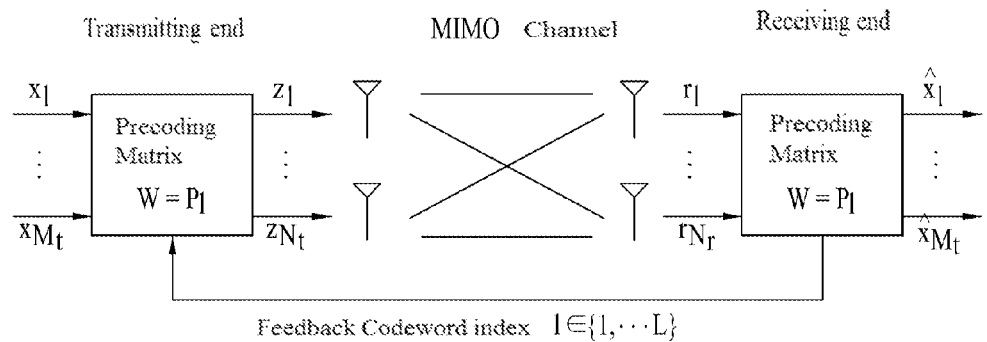
FIG. 6
(a)
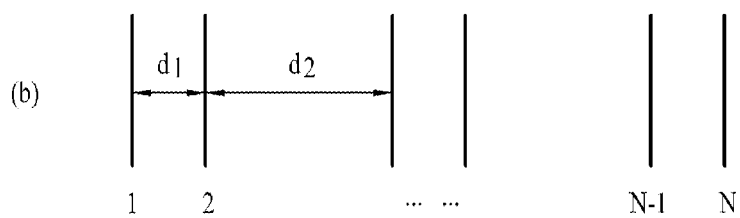
(b)
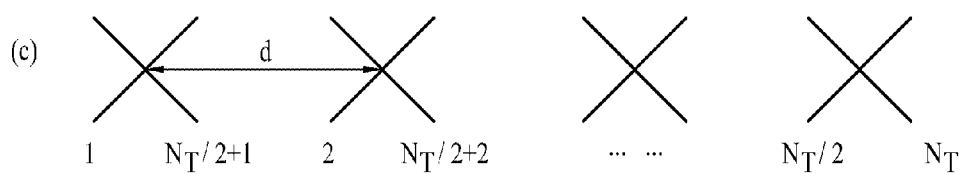
(c)

METHOD FOR TRANSMITTING SIGNAL IN MULTI-ANTENNA WIRELESS COMMUNICATION SYSTEM AND APPARATUS FOR THE SAME

CROSS-REFERENCE TO RELATED APPLICATIONS

This application is the National Stage filing under 35 U.S.C. 371 of International Application No. PCT/KR2014/001341, filed on Feb. 19, 2014, which claims the benefit of U.S. Provisional Application No. 61/766,676, filed on Feb. 19, 2013, the contents of which are all hereby incorporated by reference herein in their entirety.

TECHNICAL FIELD

The present invention relates to a wireless communication system and, more specifically, to an efficient feedback transmission method in multi-antenna wireless communication system and an apparatus for the same.

BACKGROUND ART

MIMO (multiple input multiple output) refers to a method for improving transmission/reception data efficiency using a plurality of transmit (Tx) antenna and a plurality of receive (Rx) antennas instead of a single Tx antenna and a single Rx antenna. That is, MIMO is a scheme in which a transmitting end or a receiving end of a wireless communication system improves capacity or enhances performance using multiple antennas. MIMO may be referred to as multi-antenna technology.

To support multi-antenna transmission, a precoding matrix for appropriately distributing transmission information to antenna s according to channel state can be applied. 3GPP LTE (3$^{rd}$ Generation Partnership Project Long Term Evolution) supports a maximum of 4 Tx antennas for downlink transmission and defines a precoding codebook for downlink transmission using the Tx antennas.

In a MIMO based cellular communication environment, data transfer rate can be improved through beamforming between a transmitting end and a receiving end. Whether beamforming is applied is determined based on channel information, a channel estimated through a reference signal at the receiving end is appropriately quantized using a codebook and fed back to the transmitting end.

A description will be given of a spatial channel matrix (or channel matrix) which can be used to generate a codebook. The spatial channel matrix (or channel matrix) can be represented as follows.

$$H(i,k) = \begin{bmatrix} h_{1,1}(i,k) & h_{1,2}(i,k) & \ldots & h_{1,Nt}(i,k) \\ h_{2,1}(i,k) & h_{2,2}(i,k) & \ldots & h_{2,Nt}(i,k) \\ \vdots & \vdots & \ddots & \vdots \\ h_{Nr,1}(i,k) & h_{Nr,2}(i,k) & \ldots & h_{Nr,Nt}(i,k) \end{bmatrix}$$

Here, H(i,k) represents a spatial channel matrix, $N_r$ denotes the number of Rx antennas, $N_t$ denotes the number of Tx antennas, r is an Rx antenna index, t is a Tx antenna index, i represents an OFDM (or SC-FDMA) symbol index and k represents a subcarrier index.

$h_{r,t}(i,k)$ is an element of the channel matrix H(i,k) and represents an r-th channel state and a t-th antenna corresponding to an i-th symbol and k-th subcarrier.

In addition, a spatial channel covariance matrix which can be used in the present invention will now be briefly described. The spatial channel covariance matrix can be represented by R. $R=E[H_{i,k}{}^H H_{i,k}]$ where H denotes a spatial channel matrix and R denotes a spatial channel covariance matrix. In addition, E[ ] represents the mean, i represents a symbol index and k represents a frequency index.

Singular value decomposition (SVD) is a method for decomposing a rectangular matrix, which is widely used in signal processing and statistics. SVD is to normalize matrix spectrum theory for an arbitrary rectangular matrix. An orthogonal square matrix can be decomposed into diagonal matrices using an Eigen value as a basis using spectrum theory. When it is assumed that the channel matrix H is an m×n matrix composed of a plurality of set elements, the matrix H can be represented as a product of three matrices as follows.

$$H_{m \times n} = U_{m \times n} \Sigma_{m \times n} V_{n \times n}{}^H$$

Here, U and V represent unitary matrices and Σ denotes an m×n matrix including a non-zero singular value. The singular value is $\Sigma = \text{diag}(\sigma_1 \ldots \sigma_r)$, $\sigma_i = \sqrt{\lambda_i}$. Representation as a product of three matrices is referred to as SVD. SVD can handle normal matrices, compared to Eigen value decomposition which can decompose only orthogonal square matrices. SVD and Eigen value composition are related to each other.

When the matrix H is a positive definite Hermitian matrix, all Eigen values of H are non-negative real numbers. Here, singular values and singular vectors of H are equal to Eigen values and Eigen vectors of H. Eigen value decomposition (EVD) can be represented as follows (here, Eigen values may be $\lambda_1, \ldots, \lambda_r$).

$$HH^H = (U\Sigma V^H)(U\Sigma V^H)^H = U\Sigma\Sigma^T U^H$$

$$H^H H = (U\Sigma V^H)^H (U\Sigma V^H) = V\Sigma^T \Sigma V$$

Here, Eigen values can be $\lambda_1, \ldots \lambda_r$. Information on U between U and V, which indicate channel directions, can be known through singular value decomposition of $HH^H$ and information on V can be known through singular value decomposition of $H^H H$. In general, a transmitting end and a receiving end respectively perform beamforming in order to achieve higher throughput in multi-user MIMO (MU-MIMO). When a receiving end beam and a transmitting end beam are represented by matrices T and W, a channel to which beamforming is applied is indicated by THW=TU(Σ) VW. Accordingly, it is desirable to generate the receiving end beam on the basis of U and to generate the transmitting end beam on the basis of V in order to accomplish higher throughput.

In design of a codebook, it is necessary to reduce feedback overhead using as few bits as possible and to correctly quantize a channel to obtain a sufficient beamforming gain. One of codebook design schemes presented or adopted as a standard by recent mobile communication systems, such as 3GPP LTE (3rd Generation Partnership Project Long Term Evolution), LTE-Advanced and IEEE 16m, is to transform a codebook using a long-term covariance matrix of a channel, as represented by Equation 1.

$$W'=\text{norm}(RW) \quad \text{[Equation 1]}$$

Here, W denotes an existing codebook generated to reflect short-term channel information, R denotes a long-term covariance matrix of channel matrix H, norm(A) represents a matrix in which norm is normalized into 1 per column of matrix A, and W' represents a final codebook generated by transforming the codebook W using the channel matrix H, the long-term covariance matrix R of the channel matrix H and a norm function.

The long-term covariance matrix R of the channel matrix H can be represented as Equation 2

$$R = E[H^H H] = V \Lambda V^H = \sum_{i=1}^{Nt} \sigma_i v_i v_i^H \quad \text{[Equation 2]}$$

Here, the long-term covariance matrix R of the channel matrix H is decomposed into $V\Lambda V^H$ according to singular value decomposition. V is an Nt×Nt unitary matrix having $V_i$ as an i-th column vector, $\Lambda$ is a diagonal matrix having $\sigma_i$ as an i-th diagonal component and $V^H$ is a Hermitian matrix of V. In addition, $\sigma_i$ and $V_i$ respectively denote an i-th singular value and an i-th singular column vector corresponding thereto ($\sigma_1 \geq \sigma_2 \geq \ldots \geq \sigma_{Nt}$).

DISCLOSURE

Technical Problem

An object of the present invention devised to solve the problem lies in a precoding method using a codebook in a wireless communication and an apparatus for the same.

The technical problems solved by the present invention are not limited to the above technical problems and those skilled in the art may understand other technical problems from the following description.

Technical Solution

In an aspect of the present invention, a method for transmitting, by a base station, a signal in a wireless communication system, includes: precoding a signal using a matrix for precoding; mapping the precoded signal to resource elements; and transmitting the mapped signal to a user equipment (UE), wherein the matrix for precoding is calculated on the basis of a matrix for horizontal antennas of the base station and a matrix for vertical antennas of the base station, wherein the matrices for the horizontal antennas and the vertical antennas respective have cyclic delay values.

The matrix for the horizontal antennas may be a matrix obtained by sequentially multiplying matrices $W_H(i)$, $D_H(i)$ and U and the matrix for the vertical antennas may be a matrix obtained by sequentially multiplying matrices $W_V(i)$, $D_V(i)$ and U, wherein the matrices $W_H(i)$, $D_H(i)$, $W_V(i)$ and $D_V(i)$ respectively have period values $P_{WH}$, $P_{vH}$, $P_{WV}$ and $P_{vV}$ and are cycled according to the respective period values thereof (i being a natural number), wherein the period values are set on the basis of variations in channels generated by the horizontal antennas and the vertical antennas of the base station.

The period value of the matrix for the horizontal antennas may be greater than the period value of the matrix for the vertical antennas.

The period value of the matrix for the horizontal antennas may be less than the period value of the matrix for the vertical antennas.

The matrix $W_H(i)$ may be a precoding matrix for channel control of the horizontal antennas and $P_{WH}$ may be a period value of the matrix $W_H(i)$; the matrix $W_V(i)$ may be a precoding matrix for channel control of the vertical antennas and $P_{WV}$ may be a period value of the matrix $W_V(i)$; the matrix $D_H(i)$ may be a matrix for phase delay of the horizontal antennas; the matrix $D_V(i)$ may be a matrix for phase delay of the vertical antennas; and the matrix U may be a unitary matrix.

$P_{WH}$ may be $N_V$ times $P_{WV}$, wherein $N_V$ indicates the number of vertical antennas of the base station and is an integer equal to or greater than 2.

$P_{WV}$ may be $N_V$ times $P_{WH}$, wherein $N_V$ indicates the number of vertical antennas of the base station and is an integer equal to or greater than 2.

The matrix for precoding may be represented by $\{W_H(i)D_H(i)U\} \otimes \{W_V(i)D_V(i)U\}$ wherein $\otimes$ is Kronecker product.

The matrices $D_H(i)$ and U may be identity matrices I.

The matrices $D_V(i)$ and U may be identity matrices I.

$P_{vH}$ and $P_{vV}$ may vary per resource element (RE).

In another aspect of the present invention, a method for receiving, by a UE, a signal from a base station in a wireless communication system, includes: receiving a precoded signal from the base station using a matrix for precoding, wherein the matrix for precoding is calculated on the basis of a matrix for horizontal antennas of the base station and a matrix for vertical antennas of the base station, wherein the matrices for the horizontal antennas and the vertical antennas respective have cyclic delay values.

In another aspect of the present invention, a base station for transmitting/receiving signals to/from a UE in a wireless communication system, includes: a transceiver; and a processor, wherein the processor is configured to control the base station to precode a signal using a matrix for precoding, to map the precoded signal to resource elements and to transmit the mapped signal to the UE, wherein the matrix for precoding is calculated on the basis of a matrix for horizontal antennas of the base station and a matrix for vertical antennas of the base station, wherein the matrices for the horizontal antennas and the vertical antennas respective have cyclic delay values.

Advantageous Effects

According to embodiments of the present invention, it is possible to provide a precoding method using a codebook, which can efficiently support MIMO transmission in a wireless communication system and an apparatus for the same.

The effects of the present invention are not limited to the above-described effects and other effects which are not described herein will become apparent to those skilled in the art from the following description.

DESCRIPTION OF DRAWINGS

The accompanying drawings, which are included to provide a further understanding of the invention, illustrate embodiments of the invention and together with the description serve to explain the principle of the invention. In the drawings:

FIG. 3 illustrates general MIMO communication system configurations;

FIG. 4 illustrates exemplary normal cyclic delay diversity (CDD) structures in a MIMO system;

FIG. 5 illustrates the basic concept of codebook based precoding;

FIG. 6 illustrates exemplary 8-transmission (Tx) antenna configurations;

BEST MODE

Reference will now be made in detail to the exemplary embodiments of the present invention with reference to the accompanying drawings. The detailed description, which will be given below with reference to the accompanying drawings, is intended to explain exemplary embodiments of the present invention, rather than to show the only embodiments that can be implemented according to the invention. The following detailed description includes specific details in order to provide a thorough understanding of the present invention. However, it will be apparent to those skilled in the art that the present invention may be practiced without such specific details. For example, the following detailed description is given under the assumption that 3GPP LTE and LTE-A mobile communication systems are used. However, the description is applicable to any other mobile communication system except for specific features inherent to the 3GPP LTE and LTE-A systems.

In some instances, known structures and devices are omitted, or are shown in block diagram form focusing on important features of the structures and devices, so as not to obscure the concept of the present invention. The same reference numbers will be used throughout this specification to refer to the same or like parts.

In the following description, a user equipment (UE) is assumed to refer to a mobile or fixed user end device such as a mobile station (MS), an advanced mobile station (AMS), a machine-to-machine (M2M) device, etc. and the term 'base station (BS)' is assumed to refer to any node of a network end, such as a Node B, eNode B, an access point (AP), etc., communicating with a UE.

In a mobile communication system, a UE may receive information from a BS on a downlink and transmit information to the BS on an uplink. The information that the UE transmits or receives includes data and various types of control information. There are many physical channels according to the types and usages of information that the UE transmits or receives.

3GPP LTE (3rd generation partnership project long term evolution) and LTE-A (LTE-advanced) will now be described as an exemplary mobile communication system to which the present invention is applicable.

Figure 1:
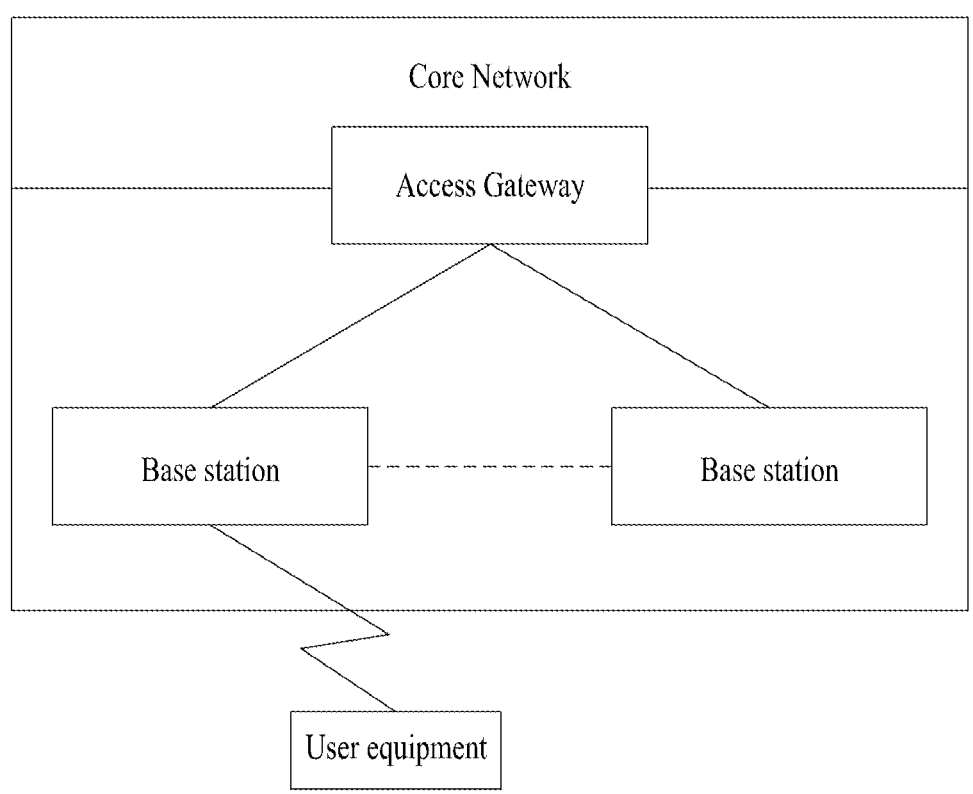
FIG. 1 illustrates E-UMTS network architecture as an exemplary mobile communication system.

FIG. 1 illustrates E-UMTS (evolved universal mobile telecommunication system) as an exemplary mobile communication system.

E-UMTS evolved from UMTS (universal mobile telecommunication system) is currently standardized in 3GPP. E-UMTS may be regarded as an LTE system. For technical specifications of UMTS and E-UMTS, reference can be made to Release 8 and Release 9 of "3rd Generation Partnership Project; Technical Specification Group Radio Access Network".

Referring to FIG. 1, E-UMTS includes a user equipment (UE), a base station (BS) and an access gateway (AG) located at the end of a network (E-UTRAN) and connected to an external network. The BS can simultaneously transmit multiple data streams for multicast service, and/or unicast service.

One or more cells are present in a BS. A cell is set to one of bandwidths of 1.25, 2.5, 5, 10, 15 and 20 MHz and provides downlink or uplink service to a plurality of UEs. Different cells may provide different bandwidths. The BS controls data transmission/reception to/from a plurality of UEs. The BS transmits downlink scheduling information about downlink data to the UE to inform the UE of a time/frequency region in which data will be transmitted, coding, data size, hybrid automatic repeat and request (HARQ) related information, etc.

In addition, the BS transmits uplink scheduling information about uplink data to the UE to inform the UE of a time frequency region that can be used by the UE, coding, data size, HARQ related information, etc. An interface for user traffic or control traffic transmission may be used between BSs. A core network (CN) may be composed of a network node for user registration of the AG and UE. The AG manages mobility of the UE for each tracking area (TA) composed of a plurality of cells.

While wireless communication technology has been developed to LTE on the basis of wideband code division multiple access (WCDMA), demands and expectations of users and service providers continuously increase. Furthermore, new wireless access technologies are continuously developed, and thus technical evolution is needed to achieve competitiveness. That is, reduction in cost per bit, service availability increase, flexible use of frequency bands, simple structure and open interface, appropriate power consumption of a UE, etc. are required.

Recently, 3GPP has performed standardization of follow-up technology regarding LTE. This technology is called 'LTE-A' in the specification. LTE and LTE-A differ mainly in terms of system bandwidth and introduction of a relay. LTE-A is aimed at supporting a wideband of up to 100 MHz. To achieve this, carrier aggregation or bandwidth aggregation that accomplishes a wideband using a plurality of frequency blocks is used. Carrier aggregation uses a plurality of frequency blocks as a wide logical frequency band in order to use a wider frequency band. The bandwidth of each frequency block can be defined based on the system block bandwidth used in LTE. Each frequency block is transmitted using a component carrier.

Figure 2:
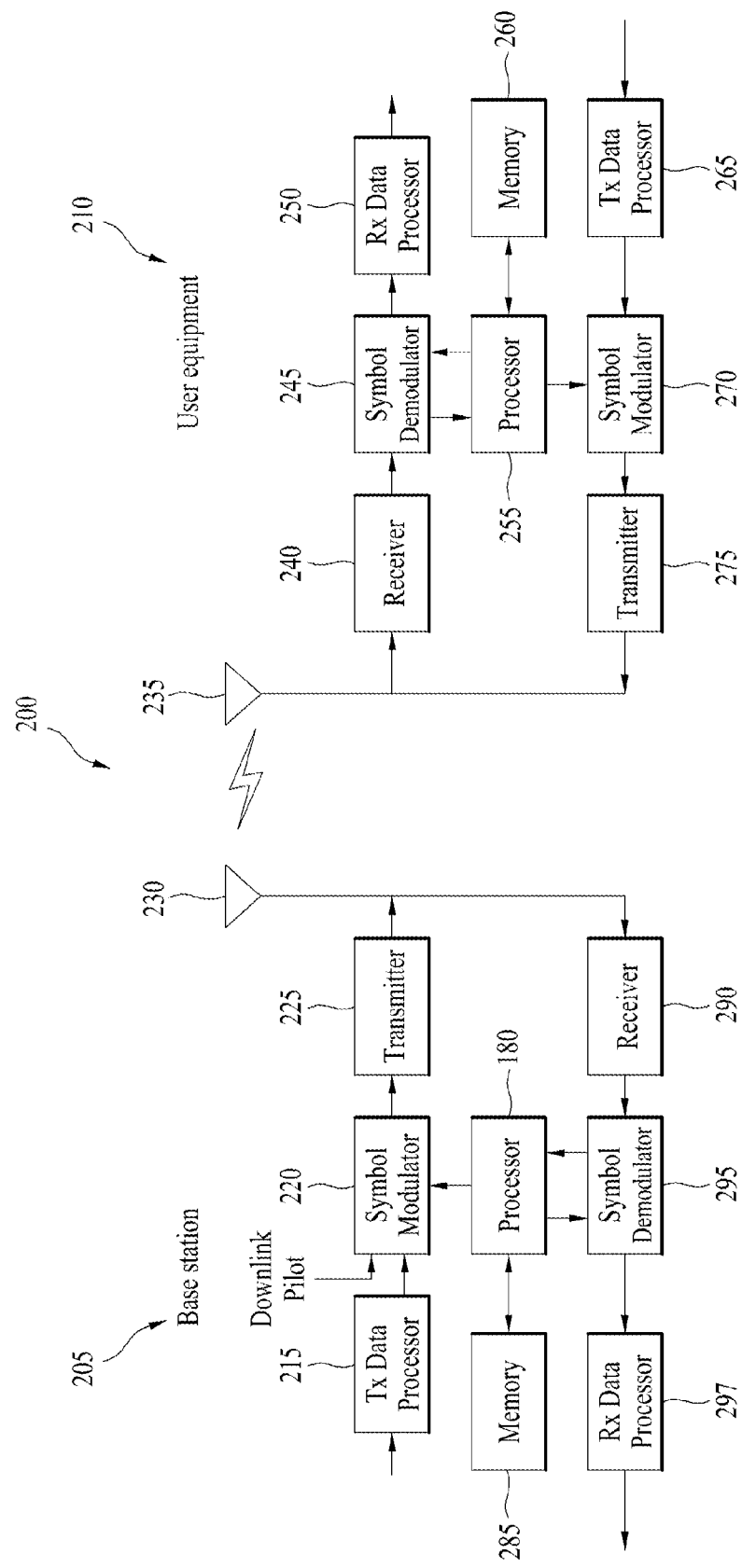
FIG. 2 is a block diagram illustrating configurations of a base station (BS) and a UE in a wireless communication system according to the present invention.

FIG. 2 is a block diagram illustrating configurations of a BS 205 and a UE 210 in a wireless communication system 200.

While one BS 205 and one UE 210 are shown in FIG. 2 to simplify the configuration of a wireless communication system 200, the wireless communication system 200 may obviously include a plurality of BSs and/or a plurality of UEs.

Referring to FIG. 2, the BS 205 may include a transmission (Tx) data processor 215, a symbol modulator 220, a transmitter 225, a Tx/Rx antenna 230, a processor 280, a memory 285, a receiver 290, a symbol demodulator 295, and an reception (Rx) data processor 297. The UE 210 may include a Tx data processor 265, a symbol modulator 270, a transmitter 275, a Tx/Rx antenna 235, a processor 255, a memory 260, a receiver 240, a symbol demodulator 245, and an Rx data processor 250. While the antennas 230 and 235 are each shown as a single antenna in the BS 205 and the UE 210, the BS 205 and the UE 210 may include multiple antennas. Hence, the BS 205 and the UE 210 support MIMO (Multiple Input Multiple Output). Furthermore, the BS 205 may support both single user-MIMO (SU-MIMO) and/or multi-user-MIMO (MU-MIMO) in the present invention.

On the downlink, the Tx data processor 215 receives traffic data, processes the received traffic data through formatting, coding, interleaving, and modulation (or symbol mapping), and thus outputs modulated symbols ("data symbols"). The symbol modulator 220 processes the data symbols received from the Tx data processor 215 and pilot symbols, thus producing a symbol stream.

More specifically, the symbol modulator 220 multiplexes the data symbols and the pilot symbols and transmits the multiplexed symbols to the transmitter 225. Each transmission symbol may be a data symbol, a pilot symbol or a zero signal value. Pilot symbols may be transmitted successively during each symbol period. The pilot symbols may be frequency division multiplexing (FDM) symbols, orthogonal frequency division multiplexing (OFDM) symbols, time division multiplexing (TDM) symbols, or code division multiplexing (CDM) symbols.

The transmitter 225 converts the symbol stream into one or more analog signals and generates a downlink signal suitable for transmission on a radio channel by additionally processing the analog signals (e.g. amplification, filtering, and frequency upconversion). The downlink signal is transmitted to the UE 210 through the antenna 230.

The UE 210 receives the downlink signal from the BS 205 through the antenna 235 and provides the received downlink signal to the receiver 240. The receiver 240 processes the downlink signal, for example, through filtering, amplification and frequency downconversion and converts the processed downlink signal into digital samples. The symbol demodulator 245 demodulates received pilot symbols and outputs the demodulated pilot symbols to the processor 255 for use in channel estimation.

The symbol demodulator 245 receives a frequency response estimate with respect to downlink from the processor 255, acquires data symbol estimates (i.e. estimates of the transmitted data symbols) by demodulating the received data symbols using the frequency response estimate and provides the data symbol estimates to the Rx data processor 250. The Rx data processor 250 demodulates the data symbol estimates (i.e. performs symbol demapping), deinterleaves the demodulated data symbols, and decodes the deinterleaved data symbols, thereby recovering the traffic data transmitted by the BS 205.

The operations of the symbol demodulator 245 and the Rx data processor 250 are complementary to the operations of the symbol modulator 220 and the Tx data processor 215 of the BS 205.

On the uplink, in the UE 210, the Tx data processor 265 outputs data symbols by processing received traffic data. The symbol modulator 270 multiplexes the data symbols received from the Tx data processor 265 with pilot symbols, modulates the multiplexed symbols, and outputs a stream of the symbols to the transmitter 275. The transmitter 275 generates an uplink signal by processing the symbol stream and transmits the uplink signal to the BS 205 through the antenna 235.

The BS 205 receives the uplink signal from the UE 210 through the antenna 230. In the BS 205, the receiver 290 acquires digital samples by processing the uplink signal. The symbol demodulator 295 provides uplink pilot symbol estimates and uplink data symbol estimates by processing the digital samples. The Rx data processor 297 processes the data symbol estimates, thereby recovering the traffic data transmitted by the UE 210.

The processors 255 and 280 control, adjust and manage operations of the UE 210 and the BS 205, respectively. The processors 255 and 280 may be connected respectively to the memories 260 and 285 that store program code and data. The memories 260 and 285 store an operating system, applications, and general files, in connection with the processors 255 and 280.

The processors 255 and 280 may also be called controllers, microcontrollers, microprocessors, or microcomputers. The processors 255 and 280 may be configured in hardware, firmware, software, or a combination thereof. When embodiments of the present invention are implemented using hardware, application specific integrated circuits (ASICs), digital signal processors (DSPs), digital signal processing devices (DSPDs), programmable logic devices (PLDs), or field programmable gate arrays (FPGAs) which are adapted to implement the present invention may be included in the processors 255 and 280. When the embodiments of the present invention are implemented using firmware or software, the firmware or software may be configured to include a module, a procedure, a function, etc. which performs functions or operations according to the present invention. The firmware or software may be included in the processors 255 and 280, or stored in the memories 260 and 285 and invoked from the memories 260 and 285 by the processors 255 and 280.

The layers of radio interface protocols between a UE/BS and a network may be classified into Layers 1, 2 and 3 (L1, L2 and L3) based on the three lowest layers of the open system interconnection (OSI) model. A physical layer corresponds to L1 and provides an information transmission service on physical channels. A radio resource control (RRC) layer corresponds to L3 and provides radio control resources between the UE and the network. The UE/BS and the network exchange RRC messages through the RRC layer.

The term "base station" used in the present invention can be called "cell" or "sector" when used as a regional concept. A serving base station (or cell) can be considered as a base station that provides conventional major services to UEs and perform transmission and reception of control information at a coordinated multiple transmission point. In view of this, the serving base station (or cell) may be called "anchor base station (or anchor cell)". Similarly, a neighboring base station may be called "neighboring cell" used as a regional concept.

MIMO System

MIMO technology is not dependent on one antenna path to receive a message, collects a plurality of data pieces received via several antennas, and completes total data. As a result, MIMO technology can increase a data transfer rate within a specific range, or can increase a system range at a specific data transfer rate. Under this situation, MIMO technology is a next-generation mobile communication technology capable of being widely applied to mobile communication terminals or RNs. MIMO technology can extend the range of data communication, so that it can overcome the limited amount of transmission (Tx) data of mobile communication systems reaching a critical situation.

FIG. 3(a) shows the configuration of a general MIMO communication system. Referring to FIG. 3(a), if the number of transmit (Tx) antennas increases to $N_T$, and at the same time the number of receive (Rx) antennas increases to $N_R$, a theoretical channel transmission capacity of the MIMO communication system increases in proportion to the number of antennas, differently from the above-mentioned case in which only a transmitter or receiver uses several antennas, so that transmission rate and frequency efficiency can be greatly increased. In this case, the transfer rate acquired by the increasing channel transmission capacity can theoretically increase by a predetermined amount that corresponds to multiplication of a maximum transfer rate ($R_o$) acquired when one antenna is used and a rate of increase ($R_i$). The rate of increase ($R_i$) can be represented by the following equation 3.

$$R_i = \min(N_T, N_R) \quad \text{[Equation 3]}$$

For example, provided that a MIMO system uses four Tx antennas and four Rx antennas, the MIMO system can theoretically acquire a high transfer rate which is four times higher than that of a single antenna system. After the above-mentioned theoretical capacity increase of the MIMO system was demonstrated in the mid-1990s, many developers began to conduct intensive research into a variety of technologies which can substantially increase data transfer rate using the theoretical capacity increase. Some of the above technologies have been reflected in a variety of wireless communication standards, for example, third-generation mobile communication or next-generation wireless LAN, etc.

A variety of MIMO-associated technologies have been intensively researched by many companies or developers, for example, research into information theory associated with MIMO communication capacity under various channel environments or multiple access environments, research into a radio frequency (RF) channel measurement and modeling of the MIMO system, and research into a space-time signal processing technology.

Mathematical modeling of a communication method for use in the above-mentioned MIMO system will hereinafter be described in detail. As can be seen from FIG. 3(a), it is assumed that there are $N_T$ Tx antennas and $N_R$ Rx antennas. In the case of a transmission signal, a maximum number of transmission information pieces is $N_T$ under the condition that $N_T$ Tx antennas are used, so that the transmission information can be represented by a specific vector shown in the following equation 4.

$$S = [S_1, S_2, \ldots S_{N_T}]^T \quad \text{[Equation 4]}$$

In the meantime, individual transmission information pieces $S_1, S_2, \ldots, S_{N_T}$ may have different transmission powers. In this case, if the individual transmission powers are denoted by $P_1, P_2, \ldots, P_{N_T}$, transmission information having an adjusted transmission power can be represented by a specific vector shown in the following equation 5.

$$\hat{S} = [\hat{S}_1, \hat{S}_2, \ldots, \hat{S}_{N_T}]^T = [P_1 S_1, P_2 S_2, \ldots, P_{N_T} S_{N_T}]^T \quad \text{[Equation 5]}$$

$\hat{S}$ can be represented by the following equation 6 using a diagonal matrix P of a transmission power.

$$\hat{s} = \begin{bmatrix} P_1 & & & 0 \\ & P_2 & & \\ & & \ddots & \\ 0 & & & P_{N_T} \end{bmatrix} \begin{bmatrix} s_1 \\ s_2 \\ \vdots \\ s_{N_T} \end{bmatrix} = Ps \quad \text{[Equation 6]}$$

In the meantime, the information vector $\hat{S}$ having an adjusted transmission power is applied to a weight matrix W, so that $N_T$ transmitted signals $x_1, x_2, \ldots, x_{N_T}$ to be actually transmitted are configured. In this case, the weight matrix W is adapted to properly distribute transmission information to individual antennas according to transmission channel situations. The above-mentioned transmitted signals $x_1, x_2, \ldots, x_{N_T}$ can be represented by the following equation 7 using the vector X. Here, $W_{ij}$ denotes a weight corresponding to i-th Tx antenna and j-th information. W represents a weight matrix or precoding matrix.

$$x = \begin{bmatrix} x_1 \\ x_2 \\ \vdots \\ x_i \\ \vdots \\ x_{N_T} \end{bmatrix} = \begin{bmatrix} w_{11} & w_{12} & \cdots & w_{1N_T} \\ w_{21} & w_{22} & \cdots & w_{2N_T} \\ \vdots & & \ddots & \vdots \\ w_{i1} & w_{i2} & \cdots & w_{iN_T} \\ \vdots & & \ddots & \vdots \\ w_{N_T 1} & w_{N_T 2} & \cdots & w_{N_T N_T} \end{bmatrix} \begin{bmatrix} \hat{s}_1 \\ \hat{s}_2 \\ \vdots \\ \hat{s}_j \\ \vdots \\ \hat{s}_{N_T} \end{bmatrix} = W\hat{s} = WPs \quad \text{[Equation 7]}$$

When $N_R$ Rx antennas are used, received signals $y_1, y_1, \ldots, y_{N_R}$ of individual antennas can be represented by the following equation 8.

$$y = [y_1, y_2, \ldots y_{N_R}]^T \quad \text{[Equation 8]}$$

In the meantime, if a channel modeling is executed in the MIMO communication system, individual channels can be distinguished from each other according to Tx/Rx antenna indexes. A specific channel passing the range from a Tx antenna j to a Rx antenna i is denoted by $h_{ij}$. In this case, it should be noted that the index order of the channel $h_{ij}$ is located before a Rx antenna index and is located after a Tx antenna index.

Several channels are tied up, so that they are displayed in the form of a vector or matrix. An exemplary vector is as follows. FIG. 3(b) shows channels from $N_T$ Tx antennas to a Rx antenna i.

Referring to FIG. 3(b), the channels passing the range from the $N_T$ Tx antennas to the Rx antenna i can be represented by the following equation 9.

$$h_i^T = [h_{i1}, h_{i2}, \ldots, h_{iN_T}] \quad \text{[Equation 9]}$$

If all channels passing the range from the $N_T$ Tx antennas to $N_R$ Rx antennas are denoted by the matrix shown in Equation 9, the following equation 10 is acquired.

$$H = \begin{bmatrix} h_1^T \\ h_2^T \\ \vdots \\ h_i^T \\ \vdots \\ h_{N_R}^T \end{bmatrix} = \begin{bmatrix} h_{11} & h_{12} & \cdots & h_{1N_T} \\ h_{21} & h_{22} & \cdots & h_{2N_T} \\ \vdots & & \ddots & \\ h_{i1} & h_{i2} & \cdots & h_{iN_T} \\ \vdots & & \ddots & \\ h_{N_R 1} & h_{N_R 2} & \cdots & h_{N_R N_T} \end{bmatrix} \quad \text{[Equation 10]}$$

Additive white Gaussian noise (AWGN) is added to an actual channel which has passed the channel matrix H shown in Equation 10. The AWGN $n_1, n_2, \ldots n_{N_R}$ added to each of $N_R$ Rx antennas can be represented by a specific vector shown in the following equation 11.

$$n = [n_1, n_2, \ldots, n_{N_R}]^T \quad \text{[Equation 11]}$$

A reception signal calculated by the above-mentioned equations can be represented by the following equation 12.

$$y = \begin{bmatrix} y_1 \\ y_2 \\ \vdots \\ y_i \\ \vdots \\ y_{N_R} \end{bmatrix} = \begin{bmatrix} h_{11} & h_{12} & \cdots & h_{1N_T} \\ h_{21} & h_{22} & \cdots & h_{2N_T} \\ \vdots & & \ddots & \\ h_{i1} & h_{i2} & \cdots & h_{iN_T} \\ \vdots & & \ddots & \\ h_{N_R 1} & h_{N_R 2} & \cdots & h_{N_R N_T} \end{bmatrix} \begin{bmatrix} x_1 \\ x_2 \\ \vdots \\ x_i \\ \vdots \\ x_{N_T} \end{bmatrix} - \begin{bmatrix} n_1 \\ n_2 \\ \vdots \\ n_i \\ \vdots \\ n_{N_R} \end{bmatrix} = \quad \text{[Equation 12]}$$

$$Hx + n$$

In the meantime, the number of rows and the number of columns of a channel matrix H indicating a channel condition are determined by the number of Tx/Rx antennas. In the channel matrix H, the number of rows is equal to the number ($N_R$) of Rx antennas, and the number of columns is equal to the number ($N_T$) of Tx antennas. Namely, the channel matrix H is denoted by an $N_R \times N_T$ matrix. Generally, a matrix rank is defined by a smaller number between the number of rows and the number of columns, in which the rows and the columns are independent of each other. Therefore, the matrix rank cannot be higher than the number of rows or columns. The rank of the channel matrix H can be represented by the following equation 13.

$$\text{rank}(H) \leq \min(N_T, N_R) \quad \text{[Equation 13]}$$

A variety of MIMO transmission/reception schemes may be used for operating the MIMO system, for example, frequency switched transmit diversity (FSTD), Space Frequency Block Coding (SFBC), Space Time Block Coding (STBC), Cyclic Delay Diversity (CDD), time switched transmit diversity (TSTD), etc. In case of Rank 2 or higher, Spatial Multiplexing (SM), Generalized Cyclic Delay Diversity (GCDD), Selective Virtual Antenna Permutation (S-VAP), etc. may be used.

The FSTD scheme serves to allocate subcarriers having different frequencies to signals transmitted through multiple antennas so as to obtain diversity gain. The SFBC scheme efficiently applies selectivity of a spatial region and a frequency region so as to obtain diversity gain and multiuser scheduling gain. The STBC scheme applies selectivity of a spatial domain and a time region. The CDD scheme serves to obtain diversity gain using path delay between transmit antennas. The TSTD scheme serves to temporally divide signals transmitted through multiple antennas. The spatial multiplexing scheme serves to transmit different data through different antennas so as to increase a transfer rate. The GCDD scheme serves to apply selectivity of a time region and a frequency region. The S-VAP scheme uses a single precoding matrix and includes a Multi Codeword (MCW)S-VAP for mixing multiple codewords among antennas in spatial diversity or spatial multiplexing and a Single Codeword (SCW)S-VAP using a single codeword.

In case of the STBC scheme from among the above-mentioned MIMO transmission schemes, the same data symbol is repeated to support orthogonality in a time domain so that time diversity can be obtained. Similarly, the SFBC scheme enables the same data symbol to be repeated to support orthogonality in a frequency domain so that frequency diversity can be obtained. An exemplary time block code used for STBC and an exemplary frequency block code used for SFBC are shown in Equation 14 and Equation 15, respectively. Equation 14 shows a block code of the case of 2 Tx antennas, and Equation 15 shows a block code of the case of 4 Tx antennas.

$$\frac{1}{\sqrt{2}} \begin{pmatrix} S_1 & S_2 \\ -S_1^* & S_1^* \end{pmatrix} \quad \text{[Equation 14]}$$

$$\frac{1}{\sqrt{2}} \begin{pmatrix} S_1 & S_2 & 0 & 0 \\ 0 & 0 & S_3 & S_4 \\ -S_2^* & S_1^* & 0 & 0 \\ 0 & 0 & -S_4^* & S_3^* \end{pmatrix} \quad \text{[Equation 15]}$$

In Equations 14 and 15, $S_i$ (i=1, 2, 3, 4) means a modulated data symbol. In addition, each row of the matrixes of Equation 14 and 15 may indicate an antenna port, and each column may indicate time (in case of STBC) or frequency (in case of SFBC).

The CDD scheme from among the above-mentioned MIMO transmission schemes mandatorily increases delay spread so as to increase frequency diversity.

FIG. 4 illustrates a general CDD structure for use in the MIMO system.

FIG. 4(a) shows a method for applying cyclic delay to a time domain. OFDM symbols are divided for respective antennas and transmitted thereto through a serial-parallel converter and a multi-antenna encoder and then sent to a receiving end with a cyclic prefix (CP) for preventing inter-channel interference attached thereto. Here, while a data sequence transmitted to the first antenna is sent to the receiving end without being varied, a data sequence sent to the next antenna is cyclic-delayed by a predetermined number of samples from the previous antenna and then transmitted. When such cyclic delay diversity scheme is implemented in the frequency domain, cyclic delay can be represented by a product of phase sequences. In other words, the CDD scheme employing cyclic delay of FIG. 4(a) may be implemented to apply phase-shift diversity as shown in FIG. 4(b).

FIG. 4(b) illustrates a method for implementing the CDD scheme as shown in FIG. 4(a) in the frequency domain. As shown in FIG. 4(b), data sequences in the frequency domain are respectively multiplied by predetermined phase sequences (phase sequences 1 to M), which are differently set for respective antennas, and then subjected to fast inverse Fourier transform and transmitted to the receiving end, which is called a phase shift diversity scheme.

Codebook Based Precoding Scheme

To support MIMO transmission, precoding for appropriately distributing transmission information to antennas according to channel state can be applied. Codebook based precoding refers to a scheme in which a transmitting terminal and a receiving terminal predetermine a set of precoding matrices, the receiving terminal (e.g. UE) measures channel information from the transmitting terminal (e.g. eNB) and feeds back information on a most suitable precoding matrix (i.e. precoding matrix index (PMI)) to the transmitting terminal and the transmitting terminal applies appropriate precoding to signal transmission.

Since the codebook based precoding scheme selects an appropriate matrix from the predetermined set of precoding matrices, feedback overhead can be reduced compared to explicit feedback of optimal precoding information to actual channel information although optimal precoding is not applied all the time.

FIG. 5 illustrates the fundamental concept of codebook based precoding.

According to the codebook based precoding scheme, the transmitting end and the receiving end share codebook information including a predetermined number of precoding matrices which are predetermined based on transmission rank, number of antennas, etc. That is, when feedback information is finite, a precoding based codebook scheme can be used. The receiving end can measure channel state through a received signal and feed back a finite number of pieces of preferred precoding matrix information (i.e. indices of corresponding precoding matrices) to the transmitting end on the basis of the aforementioned codebook information. For example, the receiving end can measure a received signal using ML (Maximum Likelihood) or MMSE (Minimum Mean Square Error) and select an optimal precoding matrix. While FIG. 5 shows that the receiving end transmits precoding matrix information per codeword to the transmitting end, the present invention is not limited thereto.

Upon reception of feedback information from the receiving end, the transmitting end can select a specific precoding matrix from the codebook based on the received information. The transmitting end can perform precoding by multiplying layer signals corresponding to a transmission rank by the selected precoding matrix and transmit precoded transmission signals to the receiving end through a plurality of antennas. In a precoding matrix, the number of rows equals the number of antennas and the number of columns equals a rank value. Since the rank value equals the number of layers, the number of columns equals to the number of layers. For example, when the number of Tx antennas is 4 and the number of transport layers is 2, a 4×2 matrix can be configured as a precoding matrix. Information transmitted through each layer can be mapped to each antenna through the precoding matrix.

Upon reception of the precoded signals transmitted from the transmitting end, the receiving end can perform inverse processing of precoding performed by the transmitting end on the received signals to recover the received signals. Since a precoding matrix satisfies unitary matrix (U) conditions such as $U*U^H=I$, inverse processing of precoding can be performed in such a manner that the received signals are multiplied by a Hermitian matrix $P^H$ of the precoding matrix P used for precoding of the transmitting terminal.

Table 1 shows a codebook used for downlink transmission using 2 Tx antennas in 3GPP LTE Release-8/9 and Table 2 shows a codebook used for downlink transmission using 4 Tx (8 Tx) antennas in 3GPP LTE Release-8/9.

As shown in Table 1, the codebook for 2 Tx antennas has a total of 7 precoding vectors/matrices. Here, since the single matrix is for an open-loop system, the number of precoding vectors/matrices for precoding of a closed-loop system becomes 6. The codebook for 4 Tx antennas, shown in Table 2, has a total or 64 precoding vectors/matrices.

In Table 2, $W_n^{\{s\}}$ is obtained form a set $\{s\}$ configured from $W_n=I-2u_nu_n^H/u_n^Hu_n$. Here, I denotes a 4×4 unitary matrix and $u_n$ is a value obtained from Table 2.

The aforementioned codebook has common characteristics such as constant modulus (CM) characteristics, nested property, constrained alphabet, etc. According to CM characteristics, elements of all precoding matrices in the codebook do not include '0' and have the same size. According to the nested property, a precoding matrix of a low rank is composed of a subset of a specific column of a precoding matrix of a high rank. The constrained alphabet characteristic refers to a characteristic that alphabets of elements of all precoding matrices in the codebook are composed of $$\left\{\pm 1, \pm j, \pm \frac{(1+j)}{\sqrt{2}}, \pm \frac{(-1+j)}{\sqrt{2}}\right\}.$$

Feedback Channel Structure

In FDD (Frequency Division Duplex) systems, an eNB cannot be aware of information on a downlink channel and thus channel information fed back by a UE is used for downlink transmission. In case of 3GPP LTE Release-8/9, a UE can feed back downlink channel information through a PUCCH or a PUSCH. The UE periodically feeds back channel information in the case of PUCCH and aperiodically feeds back the channel information at the request of the eNB in the case of PUSCH. In addition, channel information on an allocated frequency band (i.e. wideband (WB)) may be fed back or channel information on a specific number of RBs (i.e. subband (SB)) may be fed back.

Extended Antenna Configuration

FIG. 6 illustrates exemplary 8-Tx antenna configurations.

FIG. 6(a) illustrates a case in which N antennas configure independent channels without being grouped, which is referred to as a uniform linear array (ULA). In this case, a space for a transmitter and/or a receiver may be insufficient to configure independent channels by spacing out a plurality of antennas.

TABLE 1

| Codebook index | Number of layers $\upsilon$ | |
|---|---|---|
| | 1 | 2 |
| 0 | $\frac{1}{\sqrt{2}}\begin{bmatrix}1\\1\end{bmatrix}$ | $\frac{1}{\sqrt{2}}\begin{bmatrix}1 & 0\\0 & 1\end{bmatrix}$ |
| 1 | $\frac{1}{\sqrt{2}}\begin{bmatrix}1\\-1\end{bmatrix}$ | $\frac{1}{2}\begin{bmatrix}1 & 1\\1 & -1\end{bmatrix}$ |
| 2 | $\frac{1}{\sqrt{2}}\begin{bmatrix}1\\j\end{bmatrix}$ | $\frac{1}{2}\begin{bmatrix}1 & 1\\j & -j\end{bmatrix}$ |
| 3 | $\frac{1}{\sqrt{2}}\begin{bmatrix}1\\-j\end{bmatrix}$ | — |

TABLE 2

| Codebook index | $u_n$ | Number of layers v | | | |
|---|---|---|---|---|---|
| | | 1 | 2 | 3 | 4 |
| 0 | $u_0 = [1\ -1\ -1\ -1]^T$ | $W_0^{\{1\}}$ | $W_0^{\{14\}}/\sqrt{2}$ | $W_0^{\{124\}}/\sqrt{3}$ | $W_0^{\{1234\}}/2$ |
| 1 | $u_1 = [1\ -j\ 1\ j]^T$ | $W_1^{\{1\}}$ | $W_1^{\{12\}}/\sqrt{2}$ | $W_1^{\{123\}}/\sqrt{3}$ | $W_1^{\{1234\}}/2$ |
| 2 | $u_2 = [1\ 1\ -1\ 1]^T$ | $W_2^{\{1\}}$ | $W_2^{\{12\}}/\sqrt{2}$ | $W_2^{\{123\}}/\sqrt{3}$ | $W_2^{\{3214\}}/2$ |
| 3 | $u_3 = [1\ j\ 1\ -j]^T$ | $W_3^{\{1\}}$ | $W_3^{\{12\}}/\sqrt{2}$ | $W_3^{\{123\}}/\sqrt{3}$ | $W_3^{\{3214\}}/2$ |
| 4 | $u_4 = [1\ (-1-j)/\sqrt{2}\ -j\ (1-j)/\sqrt{2}]^T$ | $W_4^{\{1\}}$ | $W_4^{\{14\}}/\sqrt{2}$ | $W_4^{\{124\}}/\sqrt{3}$ | $W_4^{\{1234\}}/2$ |
| 5 | $u_5 = [1\ (1-j)/\sqrt{2}\ j\ (-1-j)/\sqrt{2}]^T$ | $W_5^{\{1\}}$ | $W_5^{\{14\}}/\sqrt{2}$ | $W_5^{\{124\}}/\sqrt{3}$ | $W_5^{\{1234\}}/2$ |
| 6 | $u_6 = [1\ (1+j)/\sqrt{2}\ -j\ (-1+j)/\sqrt{2}]^T$ | $W_6^{\{1\}}$ | $W_6^{\{13\}}/\sqrt{2}$ | $W_6^{\{134\}}/\sqrt{3}$ | $W_6^{\{1324\}}/2$ |
| 7 | $u_7 = [1\ (-1+j)/\sqrt{2}\ j\ (1+j)/\sqrt{2}]^T$ | $W_7^{\{1\}}$ | $W_7^{\{13\}}/\sqrt{2}$ | $W_7^{\{134\}}/\sqrt{3}$ | $W_7^{\{1324\}}/2$ |
| 8 | $u_8 = [1\ -1\ 1\ 1]^T$ | $W_8^{\{1\}}$ | $W_8^{\{12\}}/\sqrt{2}$ | $W_8^{\{124\}}/\sqrt{3}$ | $W_8^{\{1234\}}/2$ |
| 9 | $u_9 = [1\ -j\ -1\ -j]^T$ | $W_9^{\{1\}}$ | $W_9^{\{14\}}/\sqrt{2}$ | $W_9^{\{134\}}/\sqrt{3}$ | $W_9^{\{1234\}}/2$ |
| 10 | $u_{10} = [1\ 1\ 1\ -1]^T$ | $W_{10}^{\{1\}}$ | $W_{10}^{\{13\}}/\sqrt{2}$ | $W_{10}^{\{123\}}/\sqrt{3}$ | $W_{10}^{\{1324\}}/2$ |
| 11 | $u_{11} = [1\ j\ -1\ j]^T$ | $W_{11}^{\{1\}}$ | $W_{11}^{\{13\}}/\sqrt{2}$ | $W_{11}^{\{134\}}/\sqrt{3}$ | $W_{11}^{\{1324\}}/2$ |
| 12 | $u_{12} = [1\ -1\ -1\ 1]^T$ | $W_{12}^{\{1\}}$ | $W_{12}^{\{12\}}/\sqrt{2}$ | $W_{12}^{\{123\}}/\sqrt{3}$ | $W_{12}^{\{1234\}}/2$ |
| 13 | $u_{13} = [1\ -1\ 1\ -1]^T$ | $W_{13}^{\{1\}}$ | $W_{13}^{\{13\}}/\sqrt{2}$ | $W_{13}^{\{123\}}/\sqrt{3}$ | $W_{13}^{\{1324\}}/2$ |
| 14 | $u_{14} = [1\ 1\ -1\ -1]^T$ | $W_{14}^{\{1\}}$ | $W_{14}^{\{13\}}/\sqrt{2}$ | $W_{14}^{\{123\}}/\sqrt{3}$ | $W_{14}^{\{3214\}}/2$ |
| 15 | $u_{15} = [1\ 1\ 1\ 1]^T$ | $W_{15}^{\{1\}}$ | $W_{15}^{\{12\}}/\sqrt{2}$ | $W_{15}^{\{123\}}/\sqrt{3}$ | $W_{15}^{\{1234\}}/2$ |

FIG. 6(*b*) illustrates a paired ULA in which antennas are paired. In this case, a related channel can be configured for paired antennas and independent channels may be configured for different antenna pairs.

3GPP LTE Release-10 may use 8 Tx antennas on downlink, distinguished from 3GPP LTE Release-8/9 using 4 Tx antennas. To apply this extended antenna configuration, ULA antenna configurations as shown in FIGS. 6(*a*) and 6(*b*) may not be suitable since a plurality of Tx antennas needs to be installed in an insufficient space. Accordingly, a dual-pole (or cross-pole) antenna configuration as shown in FIG. 6(*c*) can be considered. In this case, antenna correlation can be reduced to enable data transmission with high throughput even if a distance d between antennas is short.

Codebook Structures

As described above, feedback overhead when a receiving terminal feeds back precoding information to be used for MIMO transmission from a transmitting terminal can be reduced by sharing a pre-defined codebook between the transmitting and the receiving terminal, achieving efficient precoding.

To configure a pre-defined codebook, a precoder matrix can be configured using a DFT (Discrete Fourier Transform) matrix or Walsh matrix. Otherwise, precoders in various forms can be configured according to combination with a phase shift matrix or phase shift diversity matrix.

In the case of co-polarization antenna, DFT based codebooks provide high performance. In configuration of a DFT matrix based codebook, an n×n DFT matrix can be defined as represented by Equation 16.

$$DFTn: D_n(k, \ell) = \frac{1}{\sqrt{n}}\exp(-j2\pi k\ell/n),$$ [Equation 16]
$$k, \ell = 0, 1, \ldots, n-1$$

In the case of the DFT matrix of Equation 16, only one matrix is present for a specific size n. Accordingly, a rotated version of the DFTn matrix may be additionally configured and used in order to define various precoding matrices and appropriately use the precoding matrices. Equation 4 represents an exemplary rotated DFTn matrix.

$$\text{rotated } DFTn: D_n^{(G,g)}(k, \ell) =$$ [Equation 17]
$$\frac{1}{\sqrt{n}}\exp(-j2\pi k(\ell + g/G)/n),$$
$$k, \ell = 0, 1, \ldots, n-1, g = 0, 1, \ldots, G.$$

When the DFT matrix, as represented by Equation 17, is configured, G rotated DFTn matrices can be generated and the generated matrices satisfy characteristics of the DFT matrix.

A description will be given of a Householder-based cookbook structure. A Householder-based codebook refers to a codebook composed of a Householder matrix. The Householder matrix is used for Householder transform, and Householder transform is a kind of linear transformation and can be used to perform QR decomposition. QR decomposition refers to decomposition of a matrix into an orthogonal matrix Q and an upper triangular matrix R. The upper triangular matrix refers to a square matrix in which all principal diagonal components are 0. An exemplary 4×4 Householder matrix is represented by Equation 18.

$$M_1 = I_4 - 2u_0 u_t^H / \|u_0\|^2 = \frac{1}{\sqrt{4}} * \begin{bmatrix} 1 & 1 & 1 & 1 \\ 1 & 1 & -1 & -1 \\ 1 & -1 & 1 & -1 \\ 1 & -1 & -1 & 1 \end{bmatrix},$$ [Equation 18]

$$u_0^T = [\, 1 \quad -1 \quad -1 \quad -1 \,]$$

A 4×4 unitary matrix having CM characteristic can be generated according to Householder transform. An n×n precoding matrix can be generated using Householder transform and a column subset of the generated precoding matrix can be used as a precoding matrix for transmission of a rank less than n, like a codebook for 4 Tx antennas as shown in Table 2.

Codebook for 8 Tx Antennas

In a 3GPP LTE release-10 system having an extended antenna configuration (e.g. 8 Tx antennas), a feedback scheme used in 3GPP LTE release-8/9 can be extended and applied. For example, channel state information (CSI) such as a rank indicator (RI), a precoding matrix index (PMI) and channel quality information (CQI) can be fed back. A description will be given of a method for designing a dual precoder based feedback codebook which can be used in a system supporting an extended antenna configuration. In the dual precoder based feedback codebook, a receiving end can transmit a PMI to a transmitting end in order to indicate a precoder to be used for MIMO transmission. In this case, a precoding matrix can be indicated by a combination of two different PMIs. That is, the receiving end can feed back two different PMIs (i.e. a first PMI and a second PMI) to the transmitting end and the transmitting end can determine a precoding matrix indicated by a combination of the first and second PMIs and apply the precoding matrix to MIMO transmission.

In design of the dual precoding based feedback codebook, 8 Tx antenna MIMO support, single user MIMO (SU-MIMO) and MU-MIMO, suitability for various antenna configurations, standards for codebook design, codebook size and the like may be considered.

It is possible to consider a feedback codebook which supports only SU-MIMO in the case of a rank greater than 2, is optimized for both SU-MIMO and MU-MIMO in the case of rank 2 or less and is adapted to various antenna configurations, as a codebook applied to MIMO using 8 Tx antennas.

As to MU-MIMO, it is desirable that UEs participating in MU-MIMO be separated in a correlation domain. Accordingly, a codebook for MU-MIMO needs to be designed to correctly operate in channels having high correlation. Since DFT vectors provide satisfactory performance in channels having high correlation, inclusion of a DFT vector in a set of codebooks of up to rank-2 may be considered. In addition, in a high scattering propagation environment capable of generating a large number of spatial channels (e.g. an indoor environment having a large amount of reflective waves), SU-MIMO may be more suitable as a MIMO transmission scheme. Accordingly, codebooks for ranks greater than 2 may be designed such that the codebooks enable multiple layers to be discriminated.

In design of precoders for MIMO transmission, it is desirable that one precoder configuration provide satisfactory performance for various antenna configurations (low-correlation, high-correlation and cross-polarization antenna configurations). In the arrangement of 8 Tx antennas, a cross-polarization array having an antenna interval of 4λ, may be configured as a low-correlation antenna configuration, a ULA having an antenna interval of 0.5λ may be configured as a high-correlation antenna configuration, or a cross-polarization array having an antenna interval of 0.5λ may be configured as a cross-polarization antenna configuration. DFT based codebook configurations can provide satisfactory performance for high-correlation antenna configurations.

Block diagonal matrices may be more suitable for cross-polarization antenna configuration. Accordingly, when a diagonal matrix is introduced to a codebook for 8 Tx antennas, a codebook providing satisfactory performance for all antenna configurations can be generated.

Standards for codebook design allow codebooks to satisfy a unitary codebook, CM characteristic, finite alphabets, appropriate codebook size, nested characteristics and the like, as described above. The standards are applied to 3GPP LTE release-8/9 codebook design and application of the standards for codebook design to 3GPP LTE release-10 codebook design supporting extended antenna configurations may be considered.

The codebook size needs to increase in order to sufficiently support the advantage of using 8 Tx antennas. To obtain a sufficient precoding gain from 8 Tx antennas in a low-correlation environment, a large-sized codebook (e.g. a codebook having 4 bits or more for rank 1 and rank 2) may be required. A 4-bit codebook may be sufficient to obtain a precoding gain in a high-correlation environment. However, codebook sizes for rank 1 and rank 2 can be increased in order to accomplish multiplexing gain of MU-MIMO.

Based on the above description, the present invention provides a method for generating a precoding matrix capable of reducing the amount of feedback and a new feedback structure for effective transmission in a wireless communication system. The present invention is particularly effective when a transmitter uses a massive antenna employing an active antenna system (AAS) and the massive antenna can be used for downlink communication between a BS and a UE in a cellular network in a representative embodiment.

Figure 7:
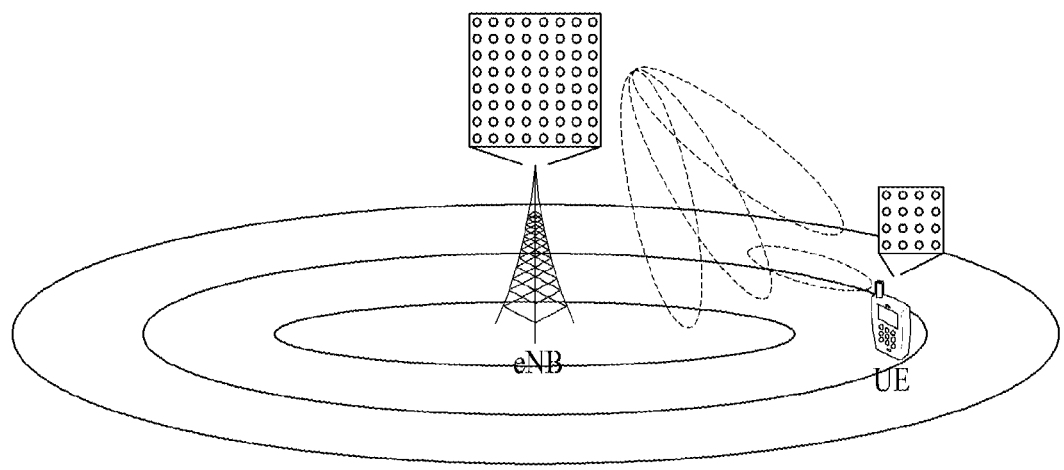
FIG. 7 illustrates an active antenna system (AAS)

FIG. 7 illustrates the AAS.

Introduction of the AAS is considered in wireless communication systems following LTE Rel-12. The AAS refers to a system composed of active antennas each of which includes an active circuit capable of controlling the phase and magnitude of a signal, distinguished from a conventional passive antenna system in which the active circuit is separated from an antenna.

Particularly, the AAS is efficient in terms of energy and operation cost since the AAS uses active antennas and thus does not require an additional cable, connector, hardware and the like to connect the active circuit to antennas. In addition, since the AAS supports electronic beam control for each antenna, the AAS enables enhanced MIMO technology such as formation of an accurate beam pattern in consideration of a beam direction and a beam width or formation of a three-dimensional beam pattern.

With the introduction of an enhanced antenna system such as the AAS, a large-scale MIMO system having a plurality of input/output antennas and a multi-dimensional antenna structure is considered. For example, when a two-dimensional antenna array instead of a conventional linear antenna array is formed, a three-dimensional beam pattern can be generated according to active antennas of the AAS.

Accordingly, when the BS uses the three-dimensional beam pattern, the BS can consider sector formation in the vertical direction of the beam as well as the horizontal direction. Furthermore, when a UE forms a reception beam using a large-scale reception antenna, the UE can expect a signal power increase according to antenna array gain and thus system performance requirements can be satisfied only with lower Tx power than that required for conventional antenna systems.

Figure 8:
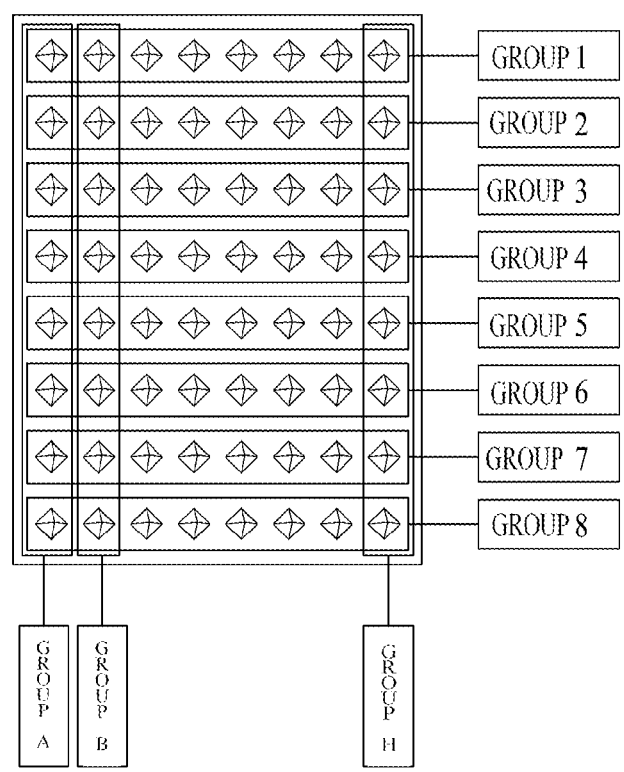
FIG. 8 illustrates a 2D-AAS to which the present invention is applicable.

FIG. 8 illustrates an exemplary 2D-AAS to which the present invention is applicable.

The 2D-AAS may be configured as a massive antenna system by installing antennas in vertical and horizontal directions. For precoding for the 2D-AAS, precoding for antennas in the vertical direction and precoding for antennas in the horizontal direction can be independently performed since the vertical antennas and the horizontal antennas may have different characteristics and may be used in different manners. For example, long-term precoding can be applied to the vertical antennas such that a larger amount of antenna beams are formed toward a receiver, whereas short-term precoding can be applied to the horizontal antennas by receiving feedback depending on channel, and vice versa. A precoding method for applying different precoding schemes on the basis of antenna installation direction is represented by Equation 19.

$$\begin{bmatrix} y^{(0)}(i) \\ \vdots \\ y^{(P-1)}(i) \end{bmatrix} = W_H \otimes W_V \begin{bmatrix} x^{(0)}(i) \\ \vdots \\ x^{(v-1)}(i) \end{bmatrix} \quad \text{[Equation 19]}$$

As shown in FIG. 8, $W_H$ and $W_V$ can be respectively defined as a precoding matrix for horizontal antennas (group 1 to group 8) and a precoding matrix for vertical antennas (group A to group H). $W_H$ and $W_V$ may be $N_H \times v_H$ and $N_V \times v_V$ matrices, respectively. $N_H$ and $N_V$ respectively represent horizontal and vertical antenna ports and $v_H$ and $v_V$ respectively represent horizontal and vertical antenna ranks. Accordingly, the total number of layers, v, is represented as $v = v_H \times v_V$. Equation 19 can be represented as Equation 20 according to $(A^T \otimes B) \text{vec}_{row}(X) = \text{vec}_{row}(AXB)$.

$$\text{vec}_{row}(Y(i)) = \text{vec}_{row}(W_H(i)X(i)\{W_V(i)\}^T) \quad \text{[Equation 20]}$$

In Equation 20, $\text{vec}_{row}(A)$ is a function that generates row-ordered columns of A matrix. X(i) is a symbol matrix having a size of $v_H \times v_V$ and $x(i) = \text{vec}_{row}(X(i))$. Accordingly, the front and back of the 2D symbol matrix X(i) in the layer domain can be respectively multiplied by two precoding matrices $W_H(i)$ and $W_V(i)$ to generate a 2D transmission matrix Y(i).

The present invention proposes a method of using large delay cyclic delay diversity (LD-CDD) when precoding represented by Equations 19 and 20 is applied to a 3D MIMO system using a 2D-AAS. Prior to description of the method, LD-CDD will now be described.

LD-CDD

LD-CDD in LTE can be represented by Equation 21.

$$\begin{bmatrix} y^{(0)}(i) \\ \vdots \\ y^{(P-1)}(i) \end{bmatrix} = W(i)D(i)U \begin{bmatrix} x^{(0)}(i) \\ \vdots \\ x^{(v-1)}(i) \end{bmatrix} \quad \text{[Equation 21]}$$

In Equation 21, $x(i) = [x^{(0)}(i) \ldots x^{(v-1)}(i)]^T$ refers to a data symbol vector to which precoding is not applied $y(i) = [y^{(0)}(i) \ldots y^{(P-1)}(i)]^T$ refers to a transmission vector that has been precoded. In Equation 21, v indicates the number of transmitted data layers and P indicates the number of independent antenna ports.

In addition, W(i) represents a precoding matrix for channel control. Accordingly, an appropriate codeword can be selected from a codebook when a channel is varied. However, a codeword is not selected depending on channel in the current LTE system and the precoding matrix W(i) for channel control, used in LTE, is represented as Equation 22.

$$\begin{cases} W(i) = C_1 & \text{for 2 antenna ports} \\ W(i) = C_k, & \\ k = \left(\left\lfloor \dfrac{i}{v} \right\rfloor \bmod 4\right) + 1 \in \{1, 2, 3, 4\} & \text{for 4 antenna ports} \end{cases}$$ [Equation 22]

In Equation 22, $C_k$ indicates a codeword and W(i) can have a fixed value or a predetermined pattern so as to cope with a varying channel. While the precoding matrix W(i) has codeword $C_1$ when the number of antenna ports is 2 or more, the precoding matrix W(i) has a codeword that varies in a predetermined pattern depending on a value k when the number of antenna ports is 4 or more.

In Equation 21, D(i) and U are used to equally disperse all layers for all virtual antennas in the virtual antenna domain. Accordingly, all layers can have equal channel quality. Signal overhead can be reduced by controlling the layers to be at an equal level. For example, when linear MMSE (Minimum Mean Square Error) is applied to a receiver, only one CQI can be fed back and individual HARQ retransmissions need not be performed for different layers, and thus downlink control signaling overhead can be decreased.

The following table 3 shows D(i) and U used in LTE.

TABLE 3

| Number of layers v | U | D(i) |
|---|---|---|
| 2 | $\dfrac{1}{\sqrt{2}}\begin{bmatrix} 1 & 1 \\ 1 & e^{-j2\pi/2} \end{bmatrix}$ | $\begin{bmatrix} 1 & 0 \\ 0 & e^{-j2\pi i/2} \end{bmatrix}$ |
| 3 | $\dfrac{1}{\sqrt{3}}\begin{bmatrix} 1 & 1 & 1 \\ 1 & e^{-j2\pi/3} & e^{-j4\pi/3} \\ 1 & e^{-j4\pi/3} & e^{-j8\pi/3} \end{bmatrix}$ | $\begin{bmatrix} 1 & 0 & 0 \\ 0 & e^{-j2\pi i/3} & 0 \\ 0 & 0 & e^{-j4\pi i/3} \end{bmatrix}$ |
| 4 | $\dfrac{1}{2}\begin{bmatrix} 1 & 1 & 1 & 1 \\ 1 & e^{-j2\pi/4} & e^{-j4\pi/4} & e^{-j6\pi/4} \\ 1 & e^{-j4\pi/4} & e^{-j8\pi/4} & e^{-j12\pi/4} \\ 1 & e^{-j6\pi/4} & e^{-j12\pi/4} & e^{-j18\pi/4} \end{bmatrix}$ | $\begin{bmatrix} 1 & 0 & 0 & 0 \\ 0 & e^{-j2\pi i/4} & 0 & 0 \\ 0 & 0 & e^{-j4\pi i/4} & 0 \\ 0 & 0 & 0 & e^{-j6\pi i/4} \end{bmatrix}$ |

When the LD-CDD system is normalized, W(i) can be defined as a channel-related precoding matrix, U can be defined as a unitary matrix and D(i) can be defined as a diagonal matrix having diagonal terms with a phase difference, as represented by Equation 23.

$$D(i) = \begin{bmatrix} 1 & 0 & \cdots & 0 \\ 0 & e^{j\theta_{1,i}} & \cdots & 0 \\ \vdots & \vdots & \ddots & 0 \\ 0 & 0 & 0 & e^{j\theta_{v-1,i}} \end{bmatrix}$$ [Equation 23]

In Equation 23, D(i) is phase-shifted per frequency. In other words, D(i) can be regarded as a matrix for phase delay. When the normalized W(i), U and D(i) are applied to Equation 21, all layers encounter beamforming that varies with frequency according to D(i) and U and can be diversified per frequency and averaged. A covariance matrix of the transmission vector y is calculated as represented by Equation 24.

$$R_{yy}^{(i)} = E[y(i)(y(i))^H] = W(i)D(i)UU^H(D(i))^H(W(i))^H = W(i)(W(i))^H$$ [Equation 24]

In Equation 24, it can be assumed that W(i) is used for precoding that increases a channel gain by using high eigenvalue of a channel. As can be seen from Equation 24, D(i) and U are used to average channel quality of all layers while maintaining the channel gain. It should be noted that D(i) and U in Equation 24 maintain the covariance matrix of the transmission vector y.

Embodiments

The present invention provides a precoding method for using LD-CDD when precoding as represented by Equation 19 or 20 is used in a 3D MIMO system to which a 2D AAS is applied. Methods of applying LD-CDD to a 2D-ASS having vertical antennas and horizontal antennas may be classified into two methods respectively represented by the following equations 25 and 26.

Method 1: $y(i) = [W_H(i) \otimes W_V(i)]D(i)Ux(i)$ [Equation 25]

Method 2:
$y(i) = [\{W_H(i)D_H(i)U_H\} \otimes \{W_V(i)D_V(i)U_V\}]x(i)$ [Equation 26]

Equation 25 (referred to as method 1 hereinafter) represents application of LD-CDD to all products of horizontal components and vertical components and Equation 26 (referred to as method 2 hereinafter) represents respective application of LD-CDD to precoding matrices of the horizontal components and the vertical components. These two methods can be applied differently according to channel state.

A situation to which method 1 is applicable is considered first. Method 1 is an LD-CDD scheme for averaging all layers according to D(i)U by acquiring a high eigenvalue of a channel according to $W_H(i) \otimes W_V(i)$. Method 1 may be suitable for a case in which all channels generated by the horizontal antennas and the vertical antennas change. When it is difficult to correctly feed back a rapidly changing channel, $W_H(i) \otimes W_V(i)$ may not play a role thereof and a diversity gain can be obtained through channels diversified according to D(i)U. While method 1 is a most general method, both D(i) and U need to be designed per rank ($v = v_H v_V$). For example, if $v_H = 4$ and $v_V = 4$, both D(i) and U need to have matrices having a predetermined size. In this case, the matrices shown in Table 3 cannot be used and D(i) and U need to be re-designed.

Accordingly, method 2 is proposed in consideration of the shortcoming of method 1. When method 2 is applied, $D_H(i)$, $D_V(i)$, $U_H$ and $U_V$ need to have matrix models having predetermined sizes, which can be easily acquired using Table 3. When it is assumed that $D_H(i)$, $D_V(i)$, $U_H$ and $U_V$ are differently designed according to H and V, method 2 requires a design of a smaller number of matrices than method 1 as the numbers of $v_H$ and $v_V$ increase.

In addition, method 2 has a wider range of use than method 1. Since the method provided by the present invention relates to 3D-MIMO systems, a channel generated by horizontal antenna elements and a channel generated by vertical antenna elements may have different characteristics. Method 2 can design $W_H(i)$ and $D_H(i)$ for the horizontal antennas and design $W_V(i)$ and $W_V(i)$ for the vertical antennas, respectively, on the basis of channel characteristics. Method 1 can design only D(i) for the horizontal and vertical antennas.

Method 2 is described in more detail. In method 2, H and V in the matrices respectively represent horizontal and vertical directions. Accordingly, the horizontal antennas and the vertical antennas can be designed (configured) in different periods on the basis of characteristics of a channel generated by the horizontal antennas and characteristics of a channel generated by the vertical antennas.

In other words, according to method 2, in a process through which a base station precodes a signal using a matrix for precoding, maps the precoded signal to resource elements (REs) and transmits the mapped signal to a UE, the matrix for precoding is represented by a product of a first matrix W, a second matrix D and a third matrix U, which is obtained by sequentially multiplying the matrices as follows.

$$\{W_H(i)D_H(i)U_H\} \otimes \{W_V(i)D_V(i)U_V\}$$

Here, H represents a matrix for horizontal antennas of the base station, V represents a matrix for vertical antennas of the base station, and i is a natural number.

A description will be given of a scheme in which D(i) and U have predetermined patterns for the horizontal antennas and the vertical antennas with reference to Equations 27 to 30.

$$W_H(i) = C_k,$$ [Equation 27]

$$k = \left(\left\lfloor \frac{i}{p_{WH}} \right\rfloor \bmod N_H\right) + 1 \in \{1, 2, \ldots, N_H\}$$

or k = fixed value $$W_V(i) = C_l,$$ [Equation 28]

$$k = \left(\left\lfloor \frac{i}{p_{WH}} \right\rfloor \bmod N_H\right) + 1 \in \{1, 2, \ldots, N_H\}$$

or l = fixed value $$D_H(i) = D'_H(m),$$ [Equation 29]

$$m = \left(\left\lfloor \frac{i}{p_{vH}} \right\rfloor \bmod v_H\right) + 1 \in \{1, 2, \ldots, v_H\}$$

or m = fixed value $$D_V(i) = D'_V(n),$$ [Equation 30]

$$m = \left(\left\lfloor \frac{i}{p_{vV}} \right\rfloor \bmod v_V\right) + 1 \in \{1, 2, \ldots, v_V\}$$

or n = fixed value

In Equations 27 to 30, the periods of $W_H(i)$, $W_V(i)$, $D_H(i)$ and $D_V(i)$ are determined as the same value depending on $p_{WH}$, $p_{WV}$, $p_{vH}$ and $p_{vV}$ and the values of $W_H(i)$ $W_V(i)$, $D_H(i)$ and $D_V(i)$ are cycled on the basis of $p_{WH}$, $p_{WV}$, $p_{vH}$ and $p_{vV}$ according to $N_H$, $N_V$, $v_H$ and $v_V$, respectively. Here, at least one period value may have the same value as another period value and $p_{WH}$, $p_{WV}$, $p_{vH}$ and $p_{vV}$ indicating lengths having the same value may be related. For example, the period values may have the following values.

$$\begin{cases} p_{vV} = 1 \\ p_{vH} = 1 \\ p_{WV} = v_H \times v_V \\ p_{WH} = N_V \times v_H \times v_V \end{cases}$$

$p_{WH}$, $p_{WV}$, $p_{vH}$ and $p_{vV}$ in Equations 27 to 30 are set to ($N_V \times v_H \times v_V$, $v_H \times v_V$, 1, 1) such that $W_H(i)$ varies for every $N_V \times v_H \times v_V$ REs ($N_V$ being the number of vertical antenna ports of the base station, which may be an integer equal to or larger than 2) and $W_V(i)$ varies for every $v_H$–$v_V$ REs. In addition, $D_H(i)$ and $D_V(i)$ vary per RE. This configuration is suitable for a situation in which a frequency flat fading channel is assumed and a channel generated by horizontal antennas change more rapidly than a channel generated by vertical antennas. For frequency flat fading channels, channels can be diversified with $D_H(i)$ and $D_V(i)$ in the frequency domain. A relatively rapidly changing horizontal channel can be diversified through $W_H(i)$, whereas a relatively slowly changing vertical channel can be diversified through $W_V(i)$ that varies more rapidly than $W_H(i)$. The period value P can be applied depending on channel state by using such method.

In addition to the aforementioned example, $p_{WH}$, $p_{WV}$, $p_{vH}$ and $p_{vV}$ indicating periods can be set through other methods. Cases shown in the following table 4 are possible.

TABLE 4

| Case | $P_{WH}$, $P_{WV}$, $P_{vH}$, $P_{vV}$ |
| --- | --- |
| 1 | $N_V v_H v_V$, $v_H v_V$, $v_V$, 1 |
| 2 | $v_H v_V$, $N_V v_H v_V$, $v_V$, 1 |
| 3 | $v_H v_V$, $v_H v_V$, $v_V$, 1 |
| 4 | $N_V v_H v_V$, $v_H v_V$, 1, $v_H$ |
| 5 | $v_H v_V$, $N_V v_H v_V$, $v_H$, 1 |
| 6 | $v_H v_V$, $v_H v_V$, $v_H$, 1 |
| 7 | $N_V v_H v_V$, $v_H v_V$, 1, 1 |
| 8 | $v_H v_V$, $N_V v_H v_V$, 1, 1 |
| 9 | $v_H v_V$, $v_H v_V$, 1, 1 |

Table 4 shows cases in which the periods of both $D_H(i)$ and $D_V(i)$ are set such that $D_H(i)$ and $D_V(i)$ change more rapidly than $W_H(i)$ and $W_V(i)$. These cases are similar to the current LTE system in which D (i) varies more rapidly than W (i), as can be seen from Table 3 and Equation 22.

Considering that horizontal channels differ from vertical channels, the periods of the precoding matrices $W_H(i)$ and $D_H(i)$ for horizontal channels may be set such that both $W_H(i)$ and $D_H(i)$ vary rapidly or slowly than precoding matrices $W_V(i)$ and $D_V(i)$ for vertical channels. Cases shown in Table 5 are possible.

TABLE 5

| Case | $P_{WH}$, $P_{WV}$, $P_{vH}$, $P_{vV}$ |
| --- | --- |
| 1 | $N_V v_H v_V$, $v_V$, $N_V v_V$, 1 |
| 2 | $N_V v_V$, $v_V$, $N_V v_V$, 1 |
| 3 | $N_V v_H v_V$, 1, $N_V v_V$, 1 |
| 4 | $N_V v_V$, 1, $N_V v_V$, 1 |
| 5 | $v_H$, $N_H v_H v_V$, 1, $N_H v_H$ |
| 6 | $v_H$, $N_H v_H$, 1, $N_H v_H$ |
| 7 | 1, $N_H v_H v_V$, 1, $N_H v_H$ |
| 8 | 1, $N_H v_H$, 1, $N_H v_H$ |

As shown in Table 5, when the periods are set depending on channel characteristics for the horizontal channels and vertical channels, diversity gain depending on channel characteristics can be obtained.

In the aforementioned method 1 corresponding to Equation 25, periods can be changed according to channel state (characteristics) as in method 2. In Method 1, $W_H(i)$, $W_V(i)$ and D(i) have patterns represented by Equations 31 to 33 as in method 4.

$$W_H(i) = C_k, \quad \text{[Equation 31]}$$
$$k = \left(\left\lfloor \frac{i}{p_{WH}} \right\rfloor \bmod N_H\right) + 1 \in \{1, 2, \ldots, N_H\}$$
or $k$ = fixed value $$W_V(i) = C_l, \quad \text{[Equation 32]}$$
$$l = \left(\left\lfloor \frac{i}{p_{WV}} \right\rfloor \bmod N_V\right) + 1 \in \{1, 2, \ldots, N_V\}$$
or $l$ = fixed value $$D(i) = D'(m), \quad \text{[Equation 33]}$$
$$m = (i \bmod v_H v_V) + 1 \in \{1, 2, \ldots, v_H v_V\}$$
or $m$ = fixed value In Equations 31 to 33, the periods of $W_H(i)$ and $W_V(i)$ are determined as the same value according to $p_{WH}$ and $p_{WV}$. The values of $W_H(i)$ and $W_V(i)$ are cycled on the basis of $p_{WH}$ and $P_{WV}$ according to $N_H$ and $N_V$. In this case, $P_{WH}$ and $P_{WV}$ indicating lengths having the same value may be related according to channel characteristics. An example is as follows.

$$\begin{cases} p_{WV} = v_H \times v_V \\ p_{WH} = N_V \times v_H \times v_V \end{cases}$$

In this case, $W_H(i)$ varies for every $N_V \times v_H \times v_V$ REs and $W_V(i)$ varies for every $v_H \times v_V$ REs. (Conversely, $W_H(i)$ may vary for every $v_H \times v_V$ REs and $W_V(i)$ may vary for every $N_V \times v_H \times v_V$ REs when the periods thereof are changed each other). Such period setting is suitable for a case in which a channel generated by horizontal antennas changes more rapidly than a channel generated by vertical antennas. $W_H(i)$ which changes slowly than $W_V(i)$ can be used for relatively rapidly changing horizontal channels and relatively slowly changing vertical channels can be diversified through $W_V(i)$ which varies more rapidly than $W_H(i)$. In this manner, an appropriate period value can be set depending on channel state. The period values may be set as follows.

$$\begin{cases} p_{WV} = N_H \times v_H \times v_V \\ p_{WH} = v_H \times v_V \end{cases}$$

or $$\begin{cases} p_{WV} = v_H \times v_V \\ p_{WH} = v_H \times v_V \end{cases}$$

As described above, $p_{WH}$, $p_{WV}$, $p_{vH}$ and $p_{vV}$ which indicate periods may use values appointed between the transmitter and the receiver or may be set through RRC signaling by a higher layer. The receiver may feed back appropriate period values to the transmitter.

That is, method 1 and method 2 apply LD-CDD to precoding. Method 1 applies LD-CDD to products of horizontal components and vertical components, whereas method 2 discriminates the horizontal components from the vertical components and applies LD-CDD to respective precoding matrices of the horizontal and vertical components. While it is difficult to modify method 1 since method 1 applies LD-CDD to all products of horizontal components and vertical components, method 2 may be modified since method 2 respectively applies LD-CDD to the horizontal components and the vertical components.

Application of LD-CDD to only one of the horizontal and vertical directions can be exemplified. An example of applying LD-CDD only to the horizontal direction (referred to as method 3 hereinafter) can be represented by Equation 34 and an example of applying LD-CDD only to the vertical direction (referred to as method 4 hereinafter) can be represented by Equation 35.

Method 3: $y(i)=[\{W_H(i)D_H(i)U_H\} \otimes W_V(i)]x(i)$ [Equation 34]

Method 4: $y(i)=[W_H(i) \otimes \{W_V(i)D_V(i)U_V\}]x(i)$ [Equation 35]

Method 3 of applying LD-CDD only to the horizontal direction can be considered as a modification of method 2 represented by Equation 26. In other words, when the matrices are designed as $W_V(i)=D_V(i)=I$ in Equation 26, Equation 34 corresponding to method 3 can be obtained. Similarly, when the matrices are designed as $W_H(i)=D_H(i)=I$ in Equation 26, Equation 35 corresponding to method 4 can be obtained. Such modifications can be applied to channel characteristics for one of horizontal and vertical channels. Accordingly, the present invention proposes a method of acquiring a diversity gain according to channel characteristics. Only one of methods 1 to 4 may be selected and applied. In addition, a method selected by the receiver through RRC signaling from the four methods may be used or a method suitable for channel characteristics may be fed back by the receiver to the transmitter.

The aforementioned methods 1 to 4 do not reduce a channel gain according to precoding matrix $W_H(i) \otimes W_V(i)$. This can be confirmed by obtaining the covariance matrix of transmission vector y in the following. A method of obtaining the covariance matrix of the transmission vector is as described above with Equation 24. It is possible to confirm that channel gain according to the precoding matrix is not reduced by obtaining the covariance matrix through the following equations 36 to 39.

$$R_{yy}^{(i)} = E[y(i)(y(i))^H] \quad \text{[Equation 36]}$$
$$= [W_H(i) \otimes W_V(i)]D(i)UU^H(D(i))^H$$
$$[W_H(i) \otimes W_V(i)]^H$$
$$= [W_H(i) \otimes W_V(i)][W_H(i) \otimes W_V(i)]^H$$

$$R_{yy}^{(i)} = E[y(i)(y(i))^H] \quad \text{[Equation 37]}$$
$$= [\{W_H(i)D_H(i)U_H\} \otimes \{W_V(i)D_V(i)U_V\}]$$
$$[\{W_H(i)D_H(i)U_H\} \otimes \{W_V(i)D_V(i)U_V\}]^H$$
$$= [\{W_H(i)D_H(i)U_H U_H^H (D_H(i))^H (W_H(i))^H\} \otimes$$
$$\{W_V(i)D_V(i)U_V U_V^H (D_V(i))^H (W_V(i))^H\}]$$
$$= [W_H(i) \otimes W_V(i)][W_H(i) \otimes W_V(i)]^H$$

$$R_{yy}^{(i)} = E[y(i)(y(i))^H] \quad \text{[Equation 38]}$$
$$= [\{W_H(i)D(i)U\} \otimes W_V(i)]$$
$$[\{W_H(i)D(i)U\}^H \otimes (W_V(i))^H]$$
$$= [\{W_H(i)D(i)UU^H(D(i))^H(W_H(i))^H\} \otimes$$
$$W_V(i)(W_V(i))^H]$$
$$= [W_H(i) \otimes W_V(i)][W_H(i) \otimes W_V(i)]^H$$

-continued $$R_{yy}^{(i)} = E[y(i)(y(i))^H] \quad \text{[Equation 39]}$$
$$= [W_H(i) \otimes \{W_V(i)D(i)U\}]$$
$$[(W_H(i))^H \otimes \{W_V(i)D(i)U\}^H]$$
$$= [W_H(i)(W_H(i))^H \otimes$$
$$\{W_V(i)D(i)UU^H(D(i))^H(W_V(i))^H\}]$$
$$= [W_H(i) \otimes W_V(i)][W_H(i) \otimes W_V(i)]^H$$

The embodiments of the present invention described hereinbelow are combinations of elements and features of the present invention. The elements or features may be considered selective unless otherwise mentioned. Each element or feature may be practiced without being combined with other elements or features. Further, an embodiment of the present invention may be constructed by combining parts of the elements and/or features. Operation orders described in embodiments of the present invention may be rearranged. Some constructions of any one embodiment may be included in another embodiment and may be replaced with corresponding constructions of another embodiment. It is obvious to those skilled in the art that claims that are not explicitly cited in each other in the appended claims may be presented in combination as an embodiment of the present invention or included as a new claim by subsequent amendment after the application is filed.

A specific operation described as performed by the BS may be performed by an upper node of the BS. Namely, it is apparent that, in a network comprised of a plurality of network nodes including a BS, various operations performed for communication with a UE may be performed by the BS, or network nodes other than the BS. The term BS may be replaced with the term, fixed station, Node B, eNode B (eNB), access point, etc.

The embodiments of the present invention may be achieved by various means, for example, hardware, firmware, software, or a combination thereof. In a hardware configuration, the methods according to the embodiments of the present invention may be achieved by one or more Application Specific Integrated Circuits (ASICs), Digital Signal Processors (DSPs), Digital Signal Processing Devices (DSPDs), Programmable Logic Devices (PLDs), Field Programmable Gate Arrays (FPGAs), processors, controllers, microcontrollers, microprocessors, etc.

In a firmware or software configuration, the embodiments of the present invention may be implemented in the form of a module, a procedure, a function, etc. For example, software code may be stored in a memory unit and executed by a processor.

The memory unit may be located at the interior or exterior of the processor and may transmit data to and receive data from the processor via various known means.

Those skilled in the art will appreciate that the present invention may be carried out in other specific ways than those set forth herein without departing from the spirit and essential characteristics of the present invention. The above embodiments are therefore to be construed in all aspects as illustrative and not restrictive. The scope of the invention should be determined by the appended claims and their legal equivalents, not by the above description, and all changes coming within the meaning and equivalency range of the appended claims are intended to be embraced therein.

INDUSTRIAL APPLICABILITY

While the efficient feedback transmission method in a multi-antenna wireless communication system and the apparatus for the same are applied to 3GPP LTE in the aforementioned embodiments, the method and apparatus can be applied to various wireless communication systems other than 3GPP LTE.

The invention claimed is:

1. A method for transmitting, by a base station, a signal in a wireless communication system, comprising:
 precoding a signal using a matrix for precoding;
 mapping the precoded signal to resource elements; and
 transmitting the mapped signal to a user equipment (UE),
 wherein the matrix for precoding is calculated on a basis of a matrix for horizontal antennas of the base station and a matrix for vertical antennas of the base station,
 wherein the matrices for the horizontal antennas and the vertical antennas respectively have cyclic delay values,
 wherein the matrix for the horizontal antennas is obtained by sequentially multiplying matrices $W_H(i)$, $D_H(i)$ and U and the matrix for the vertical antennas is obtained by sequentially multiplying matrices $W_V(i)$, $D_V(i)$ and U,
 wherein the matrices $W_H(i)$, $D_H(i)$, $W_V(i)$, and $D_V(i)$ respectively have period values $P_{WH}$, $P_{vH}$, $P_{WV}$ and $P_{vV}$ and are cycled according to the respective period values, and
 wherein the period values are set on a basis of variations in channels generated by the horizontal antennas and the vertical antennas of the base station.

2. The method according to claim 1, wherein the period value of the matrix for the horizontal antennas is greater than the period value of the matrix for the vertical antennas.

3. The method according to claim 1, wherein the period value of the matrix for the horizontal antennas is less than the period value of the matrix for the vertical antennas.

4. The method according to claim 1, wherein the matrix $W_H(i)$ is a precoding matrix for channel control of the horizontal antennas and $P_{WH}$ is a period value of the matrix $W_H(i)$, the matrix $W_V(i)$ is a precoding matrix for channel control of the vertical antennas and $P_{WV}$ is a period value of the matrix $W_V(i)$, the matrix $D_H(i)$ is a matrix for phase delay of the horizontal antennas, the matrix $D_V(i)$ is a matrix for phase delay of the vertical antennas and the matrix U is a unitary matrix.

5. The method according to claim 4, wherein $P_{WH}$ is $N_V$ times $P_{WV}$,
 where $N_V$ indicates a number of vertical antennas of the base station and is an integer equal to or greater than 2.

6. The method according to claim 4, wherein $P_{WV}$ is $N_V$ times $P_{WH}$,
 where $N_V$ indicates a number of vertical antennas of the base station and is an integer equal to or greater than 2.

7. The method according to claim 1, wherein the matrix for precoding is represented by $\{W_H(i)D_H(i)U\} \otimes \{W_V(i)D_V(i)U\}$ where $\otimes$ denotes Kronecker product.

8. The method according to claim 1, wherein the matrices $D_H(i)$ and U are identity matrices I.

9. The method according to claim 1, wherein the matrices $D_V(i)$ and U are identity matrices I.

10. The method according to claim 1, wherein $P_{vH}$ and $P_{vV}$ vary per resource element (RE).

11. A method for receiving, by a UE, a signal from a base station in a wireless communication system, comprising:
 receiving a precoded signal from the base station using a matrix for precoding,
 wherein the matrix for precoding is calculated on a basis of a matrix for horizontal antennas of the base station and a matrix for vertical antennas of the base station,
 wherein the matrices for the horizontal antennas and the vertical antennas respectively have cyclic delay values, wherein the matrix for the horizontal antennas is obtained by sequentially multiplying matrices $W_H(i)$, $D_H(i)$ and U and the matrix for the vertical antennas is obtained by sequentially multiplying matrices $W_V(i)$, $D_V(i)$ and U, wherein the matrices $W_H(i)$, $D_H(i)$, $W_V(i)$ and $D_V(i)$ respectfully have values $P_{WH}$, $P_{vH}$, $P_{WV}$ and $P_{vV}$ and are cycled according to the respective period values, and wherein the period values are set on a basis of variations in channels generated by the horizontal antennas and the vertical antennas of the base station.

12. A base station for transmitting/receiving signals to/from a UE in a wireless communication system, comprising:

a transceiver; and a processor, wherein the processor is configured to control the base station to precode a signal using a matrix for precoding, to map the precoded signal to resource elements and to transmit the mapped signal to the UE, wherein the matrix for precoding is calculated on a basis of a matrix for horizontal antennas of the base station and a matrix for vertical antennas of the base station, wherein the matrices for the horizontal antennas and the vertical antennas respectively have cyclic delay values, wherein the matrix for the horizontal antennas is obtained by sequentially multiplying matrices $W_H(i)$, $D_H(i)$ and U and the matrix for the vertical antennas is obtained by sequentially multiplying matrices $W_V(i)$, $D_V(i)$ and U, wherein the matrices $W_H(i)$, $D_H(i)$, $W_V(i)$, and $D_V(i)$ respectively have period values $P_{WH}$, $P_{vH}$, $P_{WV}$ and $P_{vV}$ and are cycled according to the respective period values, and wherein the period values are set on a basis of variations in channels generated by the horizontal antennas and the vertical antennas of the base station.

* * * * *